US007792142B2

(12) United States Patent
Taniguchi et al.

(10) Patent No.: US 7,792,142 B2
(45) Date of Patent: Sep. 7, 2010

(54) DATA TRANSMISSION DEVICE, DATA TRANSMISSION METHOD, DATA TRANSMISSION PROGRAM, DATA RECEPTION DEVICE, DATA RECEPTION METHOD, DATA RECEPTION PROGRAM, AND COMMUNICATION SYSTEM

(75) Inventors: Tsutomu Taniguchi, Nara (JP); Takeshi Nakamura, Tenri (JP); Tamotsu Mori, Kashihara (JP); Makoto Nakabayashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1055 days.

(21) Appl. No.: 10/691,417

(22) Filed: Oct. 21, 2003

(65) Prior Publication Data

US 2005/0073665 A1  Apr. 7, 2005

(30) Foreign Application Priority Data

Oct. 21, 2002  (JP)  ............................. 2002-306253

(51) Int. Cl.
*H04J 3/16* (2006.01)
(52) U.S. Cl. ................................. 370/466; 358/426.02
(58) Field of Classification Search .............. 370/235, 370/236, 465, 466; 358/1.15, 1.9, 405, 426.02, 358/426.09; 714/701, 48, 18
See application file for complete search history.

(56) References Cited

U.S. PATENT DOCUMENTS

| 5,001,571 | A  | * | 3/1991  | Murano ..................... 358/434 |
| 6,317,609 | B1 | * | 11/2001 | Alperovich et al. ...... 348/14.01 |
| 6,775,705 | B2 | * | 8/2004  | Maeda ....................... 709/230 |
| 6,785,017 | B1 | * | 8/2004  | Yoshiura ................... 358/1.15 |
| 6,882,448 | B2 | * | 4/2005  | Ishihara ..................... 358/1.9 |
| 7,000,157 | B2 | * | 2/2006  | Okamoto et al. ............ 714/712 |

(Continued)

FOREIGN PATENT DOCUMENTS

JP  06-233103  8/1994

(Continued)

OTHER PUBLICATIONS

U.S. Appl. No. 10/438,495, filed May 14, 2003, T. Shibata et al.

(Continued)

*Primary Examiner*—Ricky Ngo
*Assistant Examiner*—Pao Sinkantarakorn
(74) *Attorney, Agent, or Firm*—David G. Conlin; Steven M. Jensen; Edwards Angell Palmer & Dodge LLP

(57) ABSTRACT

In the present invention, after an image mail is transmitted to a receiving-end machine (S1, S2), when a reception error occurs, an image format of image data in the image mail is altered, and the image mail including this image data (retransmission image mail) is retransmitted to the receiving-end machine (S3 through S13). That is, it is attempted to avoid the occurrence of the communication error due to the image format, by altering the image format of the image data and retransmitting the same. With this arrangement, it is possible to avoid successive occurrence of the communication errors, even if the transmission data is retransmitted. Thus, as compared to the arrangements in which retransmission is not carried out at all or identical transmission data is retransmitted, the present arrangement can improve the efficiency of data transmission.

26 Claims, 36 Drawing Sheets

U.S. PATENT DOCUMENTS

| | | | |
|---|---|---|---|
| 2001/0040694 A1* | 11/2001 | Eguchi | 358/1.15 |
| 2003/0020961 A1* | 1/2003 | Tanimoto | 358/402 |
| 2007/0146802 A1* | 6/2007 | Ushida | 358/402 |

FOREIGN PATENT DOCUMENTS

| | | |
|---|---|---|
| JP | 10-262281 | 9/1998 |
| JP | 2000-035927 | 2/2000 |
| JP | 2001-265675 | 9/2001 |
| JP | 2001-274944 | 10/2001 |
| JP | 2001-309109 | 11/2001 |
| JP | 2002-222148 | 8/2002 |
| JP | 2002-223257 | 8/2002 |
| WO | WO-00/57594 | 9/2000 |

OTHER PUBLICATIONS

U.S. Appl. No. 10/456,250, filed Jun. 5, 2003, T. Shibata et al.

* cited by examiner

FIG. 5

IMAGE MAIL (a) HEADER

Date: 21 Sep 2001 09:25:21 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

[REQUEST FOR MDN]
[ADDRESS TO WHICH MDN IS SENT]

Disposition-Notification-To: Sharp_Doc_InternetFAX@sharp.co.jp
MIME-Version: 1.0
Content-Type: multipart/mixed; boundary="SHARP-SmTP-BOUNDARY- A30"
Content-Transfer-Encoding: 7bit
Message-ID:<111@SHARP_D1>

[MAIL IDENTIFYING ID]

(b) MAIN TEXT

--SHARP-SmTP-BOUNDARY-A30
Content-Type: text/plain; charset=iso-2022-jp
Content-Transfer-Encoding: 7bit
Content-X-CIAJWNETFAX: IGNORE DEVICE:SHARP_D1
MODEL:SHARP AR-M450
LOCATION
FILE FORMAT:TIFF(MH)
RESOLUTION: 200dpi x 200dpi
THE ATTACHMENT IS A SCANNED TIFF IMAGE FILE.

(c) ATTACHMENT FILE

--SHARP-SmTP-BOUNDARY-A30
Content-Type: image/tiff;
 name="SHARP_D1_InternetFAX_20010921_092521.tif"
Content-Transfer-Encoding: base64
Content-Disposition: attachment;
 filename="SHARP_D1_InternetFAX_20010921_092521.tif"

SUkqAAgAAAARAP4ABAABAAAAgAAAAABBAABAAAAwAYAAAEBBAABAAAAJwkAAAIBAwA

AAMBAwABAAAAwAAAAYBAwABAAAAAAAAoBAwABAAAAgAAABEBBAABAAAACgEAAB

FIG. 6

RECEPTION RESULT MAIL

(a) HEADER

Date: Thu, 20 Sep 2001 12:08:26 +0900

From: Sharp_Doc_InternetFAX@sharp.co.jp (Internet FAX)

To: Sharp_Doc_InternetFAX@sharp.co.jp ← RETURN ADDRESS AS DESIGNATED BY TRANSMITTING END Subject: Your message was processed successfully. (MDN)

MIME-Version: 1.0

Content-Type: multipart/report; report-type=disposition-notification; boundary="__boundary__"

Message-ID: <20010920030050293.AAA239@sharp.co.jp>

---

(b) MAIN TEXT

--__boundary__

Content-Type: text/plain; charset="US-ASCII"

Content-Transfer-Encoding: 7bit

This is a Return Receipt for the mail that you sent to

"Sharp_Doc_InternetFAX@sharp.co.jp".on 20 Jun 2002 09:00:00 +0900.

The message and attached files[s] may have been printed, faxed or saved. This is no guarantee that the message has been read or understood.

---

(c) MDN RESULT INFORMATION

--__boundary__

Content-Type: message/disposition-notification

Content-Transfer-Encoding: 7bit

Final-Recipient: rfc822;Sharp_Doc_InternetFAX@sharp.co.jp

Original-Message-Id: <111@SHARP_D1>

Disposition: automatic-action/MDN-sent-automatically; dispatched

Media-Accept-Features: (& (color=Binary)  
(image-file-structure=TIFF-limited)  
(dpi=200) (dpi-xyratio=[200/100,200/200])  
(image-coding=[MH,MR,MMR])  
(MRC-mode=0)  
(paper-size=[A4,B4,A3]))

← RECEPTION CAPABILITY NOTIFICATION

--__boundary__--

FIG. 8

SHORT NUMBER LIST

| SHORT NUMBER | RECEIVING-END MACHINE | E-MAIL ADDRESS | FILE FORMAT | COMPRESSION FORMAT | RECEPTION RESULT REQUEST | TIME LIMIT (1-240 MINUTES) | THE NUMBER OF RETRANSMISSIONS (0-15 TIMES) | FORMAT ALTERATION AT THE TIME OF RETRANSMISSION |
|---|---|---|---|---|---|---|---|---|
| 001 | *** | 11@*** | PDF | MH | YES | 60 | 2 | YES |
| 002 | *** | 22@*** | PDF | MH | YES | 120 | 3 | NO |
| 003 | *** | 33@*** | TIFF | MH | YES | 60 | 2 | YES |
| 004 | *** | 44@*** | TIFF | MH | NO | - | - | - |
| . | . | . | . | . | . | . | . | . |
| . | . | . | . | . | . | . | . | . |
| . | . | . | . | . | . | . | . | . |

FORMAT SETTING OF IMAGE DATA — columns: FILE FORMAT, COMPRESSION FORMAT
MDN SETTING — columns: RECEPTION RESULT REQUEST, TIME LIMIT
RETRANSMISSION SETTING — columns: THE NUMBER OF RETRANSMISSIONS, FORMAT ALTERATION AT THE TIME OF RETRANSMISSION

FIG. 11

IMAGE MAIL

(a) HEADER

Date: 20 Jun 2002 09:00:00 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

[REQUEST FOR MDN]
[ADDRESS TO WHICH MDN IS SENT]

Disposition-Notification-To: Sharp_Doc_InternetFAX@sharp.co.jp
MIME-Version: 1.0
Content-Type: multipart/mixed; boundary="SHARP-SmTP-BOUNDARY- A30"
Content-Transfer-Encoding: 7bit
Message-ID:<111@SHARP_D1>

[MAIL IDENTIFYING ID]

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MMR)
RESOLUTION: 200dpi x 200dpi
THE ATTACHMENT IS A SCANNED TIFF IMAGE FILE.

(c) ATTACHMENT FILE

--SHARP-SmTP-BOUNDARY-A30
Content-Type: image/tiff;
 name="SHARP_D1_InternetFAX_2002001.tif"
Content-Transfer-Encoding: base64
Content-Disposition: attachment;
 filename="SHARP_D1_InternetFAX_2002001.tif"

SUkqAAgAAAARAP4ABAABAAAAgAAAAABBAABAAAAwAYAAAEBBAABAAAAJwkAAAIBAwA
AAMBAwABAAAAwAAAAYBAwABAAAAAAAAoBAwABAAAAgAAABEBBAABAAAACgEAAB

FIG. 12

RECEPTION RESULT MAIL (a) HEADER

Date: 20 Jun 2002 12:00:00 +0900

From: document@sharp.co.jp

To: Sharp_Doc_InternetFAX@sharp.co.jp ← RETURN ADDRESS AS DESIGNATED BY TRANSMITTING END Subject: Your message was processed error. (MDN)

MIME-Version: 1.0

Content-Type: multipart/report; report-type=disposition-notification; boundary="__boundary__"

Message-ID: <20020620030050293.AAA239@sharp.co.jp>

---

(b) MAIN TEXT

--__boundary__

Content-Type: text/plain; charset="US-ASCII"

Content-Transfer-Encoding: 7bit

This is a Return Receipt for the mail that you sent to

"document@sharp.co.jp". on 20 Jun 2002 09:00:00 +0900.

An error occurred while attempting to decode the attached file[s].

---

(c) MDN RESULT INFORMATION

--__boundary__

Content-Type: message/disposition-notification

Content-Transfer-Encoding: 7bit

Final-Recipient: rfc822;document@sharp.co.jp

Original-Message-Id: <111@SHARP_D1>

Disposition: automatic-action/MDN-sent-automatically; processed/error

Media-Accept-Features: (& (color=Binary)

(image-file-structure=TIFF-limited)

(dpi=200) (dpi-xyratio=[200/100,200/200]) ← RECEPTION CAPABILITY NOTIFICATION (image-coding=[MH])

(MRC-mode=0)

(paper-size=[A4,B4,A3]))

--__boundary__--

FIG. 13

IMAGE MAIL (FOR RETRANSMISSION)

(a) HEADER

Date: 20 Jun 2002 15:00:00 +0900
To: document@sharp.co.jp
From: SHARP D1 InternetFAX <Sharp_Doc_InternetFAX@sharp.co.jp>
Subject: Re.InternetFAX : SHARP D1
Sender: Sharp_Doc_InternetFAX@sharp.co.jp (Internet FAX)
Reply-To: <Sharp_Doc_InternetFAX@sharp.co.jp>   [ADDRESS TO WHICH MDN IS SENT]
X-Mailer: X-SHARP Network Scanner System

[REQUEST FOR MDN]
Disposition-Notification-To: Sharp_Doc_InternetFAX@sharp.co.jp
MIME-Version: 1.0
Content-Type: multipart/mixed; boundary="SHARP-SmTP-BOUNDARY- A30"
Content-Transfer-Encoding: 7bit
Message-ID:<222@SHARP_D1>   [MAIL IDENTIFYING ID]

---

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MH)
RESOLUTION: 200dpi x 200dpi
THE ATTACHMENT IS A SCANNED TIFF IMAGE FILE.

---

(c) ATTACHMENT FILE

--SHARP-SmTP-BOUNDARY-A30
Content-Type: image/tiff;
 name="Re.SHARP_D1_InternetFAX_2002001.tif"
Content-Transfer-Encoding: base64
Content-Disposition: attachment;
 filename="SHARP_D1_InternetFAX_2002001.tif"

SUkqAAgAAAARAP4ABAABAAAAgAAAAABBAABAAAAwAYAAAEBBAABAAAAJwkAAAIBAwA
AAMBAwABAAAAAwAAAAYBAwABAAAAAAAAAoBAwABAAAAgAAABEBBAABAAAACgEAAB

FIG. 14

RECEPTION RESULT MAIL (a) HEADER

Date: 20 Jun 2002 16:00:00 +0900

From: document@sharp.co.jp

To: Sharp_Doc_InternetFAX@sharp.co.jp ← RETURN ADDRESS AS DESIGNATED BY TRANSMITTING END Subject: Your message was processed dispatched. (MDN)

MIME-Version: 1.0

Content-Type: multipart/report; report-type=disposition-notification; boundary="__boundary__"

Message-ID: <20020620030050293.AAA239@sharp.co.jp>

---

(b) MAIN TEXT

--__boundary__

Content-Type: text/plain; charset="US-ASCII"

Content-Transfer-Encoding: 7bit

This is a Return Receipt for the mail that you sent to
"document@sharp.co.jp".
The message and attached files[s] may have been printed,
faxed or saved. This is no guarantee that the message
has been read or understood.

---

(c) MDN RESULT INFORMATION

--__boundary__

Content-Type: message/disposition-notification

Content-Transfer-Encoding: 7bit

Final-Recipient: rfc822;document@sharp.co.jp

Original-Message-Id: <222@SHARP_D1>

Disposition: automatic-action/MDN-sent-automatically; dispatched

Media-Accept-Features: (& (color=Binary)
(image-file-structure=TIFF-limited)
(dpi=200) (dpi-xyratio=[200/100,200/200])
(image-coding=[MH])
(MRC-mode=0)
(paper-size=[A4,B4,A3]))   ← RECEPTION CAPABILITY NOTIFICATION --__boundary__--

FIG. 17

IMAGE MAIL (a) HEADER

Date: 20 Jun 2002 09:00:00 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

[REQUEST FOR MDN] [ADDRESS TO WHICH MDN IS SENT]

Disposition-Notification-To: Sharp_Doc_InternetFAX@sharp.co.jp
MIME-Version: 1.0
Content-Type: multipart/mixed; boundary="SHARP-SmTP-BOUNDARY- A30"
Content-Transfer-Encoding: 7bit
Message-ID:<111@SHARP_D1>  [MAIL IDENTIFYING ID]

---

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION
FILE FORMAT:TIFF(MMR)
RESOLUTION: 200dpi x 200dpi
THE ATTACHMENT IS A SCANNED TIFF IMAGE FILE.

---

(c) ATTACHMENT FILE

--SHARP-SmTP-BOUNDARY-A30
Content-Type: image/tiff;
 name="SHARP_D1_InternetFAX_2002001.tif"
Content-Transfer-Encoding: base64
Content-Disposition: attachment;
 filename="SHARP_D1_InternetFAX_2002001.tif"

SUkqAAgAAAARAP4ABAABAAAAgAAAAABBAABAAAAwAYAAAEBBAABAAAAJwkAAAIBAwA
AAMBAwABAAAAwAAAAYBAwABAAAAAAAAAoBAwABAAAAAgAAABEBBAABAAAACgEAAB

FIG. 18

RECEPTION RESULT MAIL

(a) HEADER

Date: 20 Jun 2002 12:00:00 +0900

From: document@sharp.co.jp

To: Sharp_Doc_InternetFAX@sharp.co.jp ← RETURN ADDRESS AS DESIGNATED BY TRANSMITTING END Subject: Your message was processed error. (MDN)

MIME-Version: 1.0

Content-Type: multipart/report; report-type=disposition-notification; boundary="__boundary__"

Message-ID: <20020620030050293.AAA239@sharp.co.jp>

---

(b) MAIN TEXT

--__boundary__

Content-Type: text/plain; charset="US-ASCII"

Content-Transfer-Encoding: 7bit

This is a Return Receipt for the mail that you sent to
"document@sharp.co.jp".on 20 Jun 2002 09:00:00 +0900.
An error occurred while attempting to decode
the attached file[s].

---

(c) MDN RESULT INFORMATION

--__boundary__

Content-Type: message/disposition-notification

Content-Transfer-Encoding: 7bit

Final-Recipient: rfc822;document@sharp.co.jp

Original-Message-Id: <111@SHARP_D1>

Disposition: automatic-action/MDN-sent-automatically; processed/error

--__boundary__--

FIG. 19

IMAGE MAIL (FOR RETRANSMISSION)

(a) HEADER

Date: 20 Jun 2002 15:00:00 +0900
To: document@sharp.co.jp
From: SHARP D1 InternetFAX <Sharp_Doc_InternetFAX@sharp.co.jp>
Subject: Re.InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

[REQUEST FOR MDN] [ADDRESS TO WHICH MDN IS SENT]

Disposition-Notification-To: Sharp_Doc_InternetFAX@sharp.co.jp
MIME-Version: 1.0
Content-Type: multipart/mixed; boundary="SHARP-SmTP-BOUNDARY-A30"
Content-Transfer-Encoding: 7bit
Message-ID:<222@SHARP_D1>   [MAIL IDENTIFYING ID]

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MR)
RESOLUTION: 200dpi x 200dpi
THE ATTACHMENT IS A SCANNED TIFF IMAGE FILE.

(c) ATTACHMENT FILE

--SHARP-SmTP-BOUNDARY-A30
Content-Type: image/tiff;
 name="Re.SHARP_D1_InternetFAX_2002001.tif"
Content-Transfer-Encoding: base64
Content-Disposition: attachment;
 filename="Re.SHARP_D1_InternetFAX_2002001.tif"

SUkqAAgAAAARAP4ABAABAAAAgAAAAABBAABAAAAwAYAAAEBBAABAAAAJwkAAAIBAwA

AAMBAwABAAAAwAAAAYBAwABAAAAAAAAoBAwABAAAAAgAAABEBBAABAAAACgEAAB

FIG. 20
RECEPTION RESULT MAIL (a) HEADER

Date: 20 Jun 2002 16:00:00 +0900

From: document@sharp.co.jp

To: Sharp_Doc_InternetFAX@sharp.co.jp ◄——— RETURN ADDRESS AS DESIGNATED BY TRANSMITTING END Subject: Your message was processed error. (MDN)

MIME-Version: 1.0

Content-Type: multipart/report; report-type=disposition-notification; boundary="__boundary__"

Message-ID: <20020620030050293.AAA239@sharp.co.jp>

---

(b) MAIN TEXT

--__boundary__

Content-Type: text/plain; charset="US-ASCII"

Content-Transfer-Encoding: 7bit

This is a Return Receipt for the mail that you sent to
"document@sharp.co.jp".on 20 Jun 2002 09:00:00 +0900.
An error occurred while attempting to decode
the attached file[s].

---

(c) MDN RESULT INFORMATION

--__boundary__

Content-Type: message/disposition-notification

Content-Transfer-Encoding: 7bit

Final-Recipient: rfc822;document@sharp.co.jp

Original-Message-Id: <222@SHARP_D1>

Disposition: automatic-action/MDN-sent-automatically; processed/error

--__boundary__--

FIG. 21

IMAGE MAIL (FOR RETRANSMISSION)

(a) HEADER

Date: 20 Jun 2002 17:00:00 +0900
To: document@sharp.co.jp
From: SHARP D1 InternetFAX <Sharp_Doc_InternetFAX@sharp.co.jp>
Subject: Re2.InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

[REQUEST FOR MDN] [ADDRESS TO WHICH MDN IS SENT]

Disposition-Notification-To: Sharp_Doc_InternetFAX@sharp.co.jp
MIME-Version: 1.0
Content-Type: multipart/mixed; boundary="SHARP-SmTP-BOUNDARY- A30"
Content-Transfer-Encoding: 7bit
Message-ID:<333@SHARP_D1>   [MAIL IDENTIFYING ID]

---

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MH)
RESOLUTION: 200dpi x 200dpi
THE ATTACHMENT IS A SCANNED TIFF IMAGE FILE.

---

(c) ATTACHMENT FILE

--SHARP-SmTP-BOUNDARY-A30
Content-Type: image/tiff;
 name="Re2.SHARP_D1_InternetFAX_2002001.tif"
Content-Transfer-Encoding: base64
Content-Disposition: attachment;
 filename="Re2.SHARP_D1_InternetFAX_2002001.tif"

SUkqAAgAAAARAP4ABAABAAAAgAAAAABBAABAAAAwAYAAAEBBAABAAAAJwkAAAIBAwA
AAMBAwABAAAAwAAAAYBAwABAAAAAAAAAoBAwABAAAAgAAABEBBAABAAAACgEAAB

FIG. 22

(a) HEADER

Date: 20 Jun 2002 18:00:00 +0900

From: document@sharp.co.jp

To: Sharp_Doc_InternetFAX@sharp.co.jp  ← RETURN ADDRESS AS DESIGNATED BY TRANSMITTING END Subject: Your message was processed dispatched. (MDN)

MIME-Version: 1.0

Content-Type: multipart/report; report-type=disposition-notification; boundary="__boundary__"

Message-ID: <20020620030050293.AAA239@sharp.co.jp>

---

(b) MAIN TEXT

--__boundary__

Content-Type: text/plain; charset="US-ASCII"

Content-Transfer-Encoding: 7bit

This is a Return Receipt for the mail that you sent to
"document@sharp.co.jp".on 20 Jun 2002 09:00:00 +0900.
The message and attached files[s] may have been printed,
faxed or saved. This is no guarantee that the message
has been read or understood.

---

(c) MDN RESULT INFORMATION

--__boundary__

Content-Type: message/disposition-notification

Content-Transfer-Encoding: 7bit

Final-Recipient: rfc822;document@sharp.co.jp

Original-Message-Id: <333@SHARP_D1>

Disposition: automatic-action/MDN-sent-automatically; dispatched

--__boundary__--

FIG. 25

INITIAL IMAGE MAIL (a) HEADER

Date: 20 Jun 2002 09:00:00 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

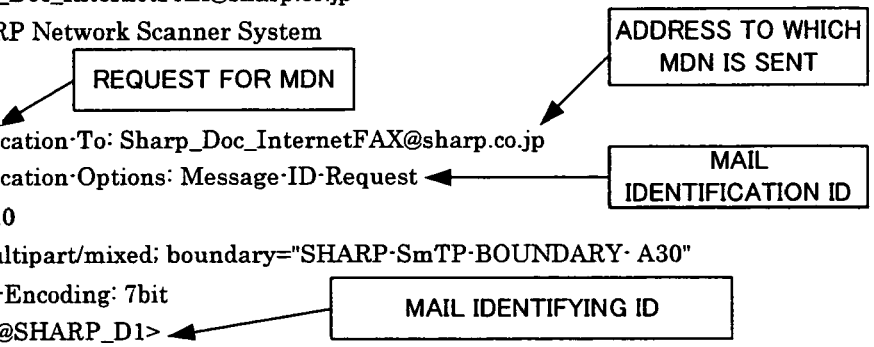

Disposition-Notification-To: Sharp_Doc_InternetFAX@sharp.co.jp
Disposition-Notification-Options: Message-ID-Request
MIME-Version: 1.0
Content-Type: multipart/mixed; boundary="SHARP-SmTP-BOUNDARY-A30"
Content-Transfer-Encoding: 7bit
Message-ID:<111@SHARP_D1>

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MMR)
RESOLUTION: 200dpi x 200dpi
THE ATTACHMENT IS A SCANNED TIFF IMAGE FILE.

(c) ATTACHMENT FILE

--SHARP-SmTP-BOUNDARY-A30
Content-Type: image/tiff;
 name="SHARP_D1_InternetFAX_20010921_092521.tif"
Content-Transfer-Encoding: base64
Content-Disposition: attachment;
 filename="SHARP_D1_InternetFAX_20010921_092521.tif"

SUkqAAgAAAARAP4ABAABAAAAgAAAAABBAABAAAAwAYAAAEBBAABAAAAJwkAAAIBAwA
AAMBAwABAAAAwAAAAYBAwABAAAAAAAAoBAwABAAAAAgAAABEBBAABAAAACgEAAB

FIG. 26

RECEPTION RESULT MAIL

(a) HEADER

Date: 20 Jun 2002 12:00:00 +0900

From: document@sharp.co.jp

To: Sharp_Doc_InternetFAX@sharp.co.jp ← RETURN ADDRESS AS DESIGNATED BY TRANSMITTING END Subject: Your message was processed error. (MDN)

MIME-Version: 1.0

Content-Type: multipart/report; report-type=disposition-notification; boundary="__boundary__"

Message-ID: <AAA@SHARP_D1>

---

(b) MAIN TEXT

--__boundary__

Content-Type: text/plain; charset="US-ASCII"

Content-Transfer-Encoding: 7bit

This is a Return Receipt for the mail that you sent to
"document@sharp.co.jp". on 20 Jun 2002 09:00:00 +0900.
An error occurred while attempting to decode
the attached file[s].

---

(c) MDN RESULT INFORMATION

--__boundary__

Content-Type: message/disposition-notification

Content-Transfer-Encoding: 7bit content-X-From-Request; <111@SHARP_D1> ← MAIL IDENTIFICATION ID Final-Recipient: rfc822;document@sharp.co.jp Original-Message-Id: <111@SHARP_D1> ← RETURN MAIL IDENTIFICATION ID Disposition: automatic-action/MDN-sent-automatically; processed/error Media-Accept-Features: (& (color=Binary)
(image-file-structure=TIFF-limited)
(dpi=200) (dpi-xyratio=[200/100,200/200])
(image-coding=[MH])
(MRC-mode=0)
(paper-size=[A4,B4,A3])) ← RECEPTION CAPABILITY NOTIFICATIO --__boundary__--

FIG. 27

RETRANSMISSION IMAGE MAIL

(a) HEADER

Date: 20 Jun 2002 13:00:00 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System
★In-Replay-To:<AAA@SHARP_D1>
★References:<AAA@SHARP_D1>
Disposition-Notification-To: Sharp_Doc_InternetFAX@sharp.co.jp
Disposition-Notification-Options: <111@SHARP_D1> ◄── MESSAGE-ID OF INITIAL IMAGE MAIL
MIME-Version: 1.0
Content-Type: multipart/mixed; boundary="SHARP-SmTP-BOUNDARY- A30"
Content-Transfer-Encoding: 7bit
Message-ID:<222@SHARP_D1>

---

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MH)
RESOLUTION: 200dpi x 200dpi
THE ATTACHMENT IS A SCANNED TIFF IMAGE FILE.

---

(c) ATTACHMENT FILE

--SHARP-SmTP-BOUNDARY-A30
Content-Type: image/tiff;
 name="SHARP_D1_InternetFAX_20010921_092521.tif"
Content-Transfer-Encoding: base64
Content-Disposition: attachment;
 filename="SHARP_D1_InternetFAX_20010921_092521.tif"

SUkqAAgAAAARAP4ABAABAAAAgAAAAABBAABAAAAwAYAAAEBBAABAAAAJwkAAAIBAwA
AAMBAwABAAAAAwAAAAYBAwABAAAAAAAAAoBAwABAAAAAgAAABEBBAABAAAACgEAAB

FIG. 29 (a)  COMMUNICATION MANAGEMENT TABLE

| REF. NO. | TRANSMISSION /RECEPTION | COMMUNI- CATION DATE | TIME | COMMUNI- CATION MODE | PARTY ON THE OTHER END | VOLUME OF COMMUNI- CATION | COMMUNI- CATION RESULT |
|---|---|---|---|---|---|---|---|
| 001 | RECEPTION | 2002/6/20 | 9:00 | mail | Sharp_Doc_InternetFAX@sharp.co.jp | 0 | NG |
| 002 | RECEPTION | 2002/6/20 | 10:00 | mail | harp_Doc_InternetFAX@sharp.co.jp | 2 | OK |
| 003 | RECEPTION | 2002/6/20 | 11:00 | FAX | 123456789 | 5 | OK |
| 004 | TRANSMISSION | 2002/6/20 | 12:00 | mail | Sharp_Doc_InternetFAX@sharp.co.jp | 0 | OK |

FIG. 29 (b)  COMMUNICATION MANAGEMENT TABLE

| REF. NO. | TRANSMISSION /RECEPTION | COMMUNI- CATION DATE | TIME | COMMUNI- CATION MODE | PARTY ON THE OTHER END | VOLUME OF COMMUNI- CATION | COMMUNI- CATION RESULT | RETRANS- MISSION (REF. NO.) |
|---|---|---|---|---|---|---|---|---|
| 001 | RECEPTION | 2002/6/20 | 9:00 | mail | Sharp_Doc_InternetFAX@sharp.co.jp | 0 | NG | |
| 002 | RECEPTION | 2002/6/20 | 10:00 | mail | harp_Doc_InternetFAX@sharp.co.jp | 2 | OK | |
| 003 | RECEPTION | 2002/6/20 | 11:00 | FAX | 123456789 | 5 | OK | |
| 004 | TRANSMISSION | 2002/6/20 | 12:00 | mail | Sharp_Doc_InternetFAX@sharp.co.jp | 0 | OK | |
| 005 | RECEPTION | 2002/6/20 | 13:00 | mail | Sharp_Doc_InternetFAX@sharp.co.jp | 5 | OK | 001 |
| 006 | TRANSMISSION | 2002/6/20 | 14:00 | mail | Sharp_Doc_InternetFAX@sharp.co.jp | 0 | OK | |

FIG. 29 (c)  COMMUNICATION MANAGEMENT TABLE

| REF. NO. | TRANSMISSION /RECEPTION | COMMUNI- CATION DATE | TIME | COMMUNI- CATION MODE | PARTY ON THE OTHER END | VOLUME OF COMMUNI- CATION | COMMUNI- CATION RESULT |
|---|---|---|---|---|---|---|---|
| 001 | RECEPTION | 2002/6/20 | 9:00 | mail | Sharp_Doc_InternetFAX@sharp.co.jp | 5 | OK ← RETULT IS UPDATED |
| 002 | RECEPTION | 2002/6/20 | 10:00 | mail | harp_Doc_InternetFAX@sharp.co.jp | 2 | OK |
| 003 | RECEPTION | 2002/6/20 | 11:00 | FAX | 123456789 | 5 | OK |
| 004 | TRANSMISSION | 2002/6/20 | 12:00 | mail | Sharp_Doc_InternetFAX@sharp.co.jp | 0 | OK |

FIG. 30

RECEPTION RESULT MAIL

(a) HEADER

Date: 20 Jun 2002 12:00:00 +0900

From: document@sharp.co.jp

To: Sharp_Doc_InternetFAX@sharp.co.jp ← RETURN ADDRESS AS DESIGNATED BY TRANSMITTING END Subject: Your message was processed dispatched. (MDN)

MIME-Version: 1.0

Content-Type: multipart/report; report-type=disposition-notification; boundary="__boundary__"

Message-ID: <BBB@SHARP_D1>

---

(b) MAIN TEXT

--__boundary__

Content-Type: text/plain; charset="US-ASCII"

Content-Transfer-Encoding: 7bit

This is a Return Receipt for the mail that you sent to
"document@sharp.co.jp".on 20 Jun 2002 09:00:00 +0900.

---

(c) MDN RESULT INFORMATION

--__boundary__

Content-Type: message/disposition-notification

Content-Transfer-Encoding: 7bit content-X-From-Request; <111@SHARP_D1>

Final-Recipient: rfc822;document@sharp.co.jp

Original-Message-Id: <222@SHARP_D1> ← RETURN MAIL IDENTIFICATION ID

Disposition: automatic-action/MDN-sent-automatically; dispatched

Media-Accept-Features: (& (color=Binary)
 (image-file-structure=TIFF-limited)
 (dpi=200) (dpi-xyratio=[200/100,200/200])   ← RECEPTION CAPABILITY NOTIFICATION
 (image-coding=[MH])
 (MRC-mode=0)
 (paper-size=[A4,B4,A3]))

--__boundary__--

FIG. 31 (a) In THE CONVENTIONAL ART (RECEIVING END)
COMMUNICATION MANAGEMENT TABLE

| REF. NO. | TRANSMISSION /RECEPTION | COMMUNI- CATION DATE | TIME | COMMUNI- CATION MODE | PARTY ON THE OTHER END | VOLUME OF COMMUNI- CATION | COMMUNI- CATION RESULT |
|---|---|---|---|---|---|---|---|
| 001 | RECEPTION | 2002/6/20 | 9:00 | mail | Sharp_Doc_InternetFAX@sharp.co.jp | 0 | NG |
| 002 | RECEPTION | 2002/6/20 | 10:00 | mail | harp_Doc_InternetFAX@sharp.co.jp | 2 | OK |
| 003 | RECEPTION | 2002/6/20 | 11:00 | FAX | 123456789 | 5 | OK |
| | | | | | | | |
| | | | | | | | |

FIG. 31 (b) RECEPTION OF RETRANSMISSION MAIL
COMMUNICATION MANAGEMENT TABLE

| REF. NO. | TRANSMISSION /RECEPTION | COMMUNI- CATION DATE | TIME | COMMUNI- CATION MODE | PARTY ON THE OTHER END | VOLUME OF COMMUNI- CATION | COMMUNI- CATION RESULT |
|---|---|---|---|---|---|---|---|
| 001 | RECEPTION | 2002/6/20 | 9:00 | mail | Sharp_Doc_InternetFAX@sharp.co.jp | 0 | NG |
| 002 | RECEPTION | 2002/6/20 | 10:00 | mail | harp_Doc_InternetFAX@sharp.co.jp | 2 | OK |
| 003 | RECEPTION | 2002/6/20 | 11:00 | FAX | 123456789 | 5 | OK |
| 004 | TRANSMISSION | 2002/6/20 | 12:00 | mail | Sharp_Doc_InternetFAX@sharp.co.jp | 0 | OK |
| 005 | RECEPTION | 2002/6/20 | 13:00 | mail | Sharp_Doc_InternetFAX@sharp.co.jp | 5 | OK |

RESPONSE TO "001"
RETRANS- MISSION TO "001"

FIG. 32

IN THE PRESENT INVENTION (RECEIVING END)

COMMUNICATION MANAGEMENT REPORT:
RETRANSMISSION AND RECEPTION ARE CARRIED OUT.

2002/6/20   13:05

<RECEIVED MAIL>

| REF. NO. | TRANSMISSION /RECEPTION | COMMUNI- CATION DATE | TIME | COMMUNI- CATION MODE | PARTY ON THE OTHER END | VOLUME OF COMMUNI- CATION | COMMUNI- CATION RESULT |
|---|---|---|---|---|---|---|---|
| 001 | RECEPTION | 2002/6/20 | 9:00 | mail | Sharp_Doc_InternetFAX@sharp.co.jp | 0 | NG |

<RECEPTION OF RETRANSMITTED MAIL>

| REF. NO. | TRANSMISSION /RECEPTION | COMMUNI- CATION DATE | TIME | COMMUNI- CATION MODE | PARTY ON THE OTHER END | VOLUME OF COMMUNI- CATION | COMMUNI- CATION RESULT |
|---|---|---|---|---|---|---|---|
| 005 | RECEPTION | 2002/6/20 | 13:00 | mail | Sharp_Doc_InternetFAX@sharp.co.jp | 5 | OK |

FIG. 33

INITIAL IMAGE MAIL

(a) HEADER

Date: 20 Jun 2002 09:00:00 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

[REQUEST FOR MDN]
[ADDRESS TO WHICH MDN IS SENT]
[NOTIFICATION THAT THE INITIAL IMAGE MAIL IS IN COMPLIANCE WITH THE REQUEST OF THE MDN REPLYING CONDITION]

Disposition-Notification-To: Sharp_Doc_InternetFAX@sharp.co.jp
Disposition-Notification-Options: In-Reply-To-Request
MIME-Version: 1.0
Content-Type: multipart/mixed; boundary="SHARP-SmTP-BOUNDARY- A30"
Content-Transfer-Encoding: 7bit
Message-ID:<111@SHARP_D1>       [MAIL IDENTIFYING ID]

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MMR)
RESOLUTION: 200dpi x 200dpi
THE ATTACHMENT IS A SCANNED TIFF IMAGE FILE.

(c) ATTACHMENT FILE

--SHARP-SmTP-BOUNDARY-A30
Content-Type: image/tiff;
 name="SHARP_D1_InternetFAX_20010921_092521.tif"
Content-Transfer-Encoding: base64
Content-Disposition: attachment;
 filename="SHARP_D1_InternetFAX_20010921_092521.tif"

SUkqAAgAAAARAP4ABAABAAAAAgAAAABBAABAAAAwAYAAAEBBAABAAAAJwkAAAIBAwA
AAMBAwABAAAAAwAAAAYBAwABAAAAAAAAoBAwABAAAAAgAAABEBBAABAAAACgEAAAB

FIG. 34

RECEPTION RESULT MAIL

(a) HEADER

Date: 20 Jun 2002 12:00:00 +0900

From: document@sharp.co.jp

To: Sharp_Doc_InternetFAX@sharp.co.jp ← RETURN ADDRESS AS DESIGNATED BY TRANSMITTING END Subject: Your message was processed error. (MDN)

MIME-Version: 1.0

Content-Type: multipart/report; report-type=disposition-notification; boundary="__boundary__"

Message-ID: <AAA@SHARP_D1>

---

(b) MAIN TEXT

--__boundary__

Content-Type: text/plain; charset="US-ASCII"

Content-Transfer-Encoding: 7bit

This is a Return Receipt for the mail that you sent to

"document@sharp.co.jp". on 20 Jun 2002 09:00:00 +0900.

An error occurred while attempting to decode the attached file[s].

---

(c) MDN RESULT INFORMATION

--__boundary__

Content-Type: message/disposition-notification

Content-Transfer-Encoding: 7bit content-X-From-Request;In-Reply-To ← REQUEST FOR I In-Reply-To Final-Recipient: rfc822;document@sharp.co.jp Original-Message-Id: <111@SHARP_D1> ← RETURN MAIL IDENTIFICATION ID Disposition: automatic-action/MDN-sent-automatically; processed/error Media-Accept-Features: (& (color=Binary)

(image-file-structure=TIFF-limited)

(dpi=200) (dpi-xyratio=[200/100,200/200])

(image-coding=[MH]) ← RECEPTION CAPABILITY NOTIFICATION (MRC-mode=0)

(paper-size=[A4,B4,A3]))

--__boundary__--

FIG. 35

RETRANSMISSION IMAGE MAIL

(a) HEADER

Date: 20 Jun 2002 13:00:00 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System
In-Repy-To <AAA@SHARP_D1>   ← RETURN MESSAGE ID OF RECEIVED MAIL Disposition-Notification-To: Sharp_Doc_InternetFAX@sharp.co.jp MIME-Version: 1.0
Content-Type: multipart/mixed; boundary="SHARP-SmTP-BOUNDARY- A30"
Content-Transfer-Encoding: 7bit
Message-ID:<222@SHARP_D1>

---

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MH)
RESOLUTION: 200dpi x 200dpi
THE ATTACHMENT IS A SCANNED TIFF IMAGE FILE.

---

(c) ATTACHMENT FILE

--SHARP-SmTP-BOUNDARY-A30
Content-Type: image/tiff;
 name="SHARP_D1_InternetFAX_20010921_092521.tif"
Content-Transfer-Encoding: base64
Content-Disposition: attachment;
 filename="SHARP_D1_InternetFAX_20010921_092521.tif"

SUkqAAgAAAARAP4ABAABAAAAgAAAAABBAABAAAAwAYAAAEBBAABAAAAJwkAAAIBAwA
AAMBAwABAAAAwAAAAYBAwABAAAAAAAAoBAwABAAAAAgAAABEBBAABAAAACgEAAB

FIG. 36

RECEPTION RESULT MAIL (a) HEADER

Date: 20 Jun 2002 12:00:00 +0900

From: document@sharp.co.jp

To: Sharp_Doc_InternetFAX@sharp.co.jp ← RETURN ADDRESS AS DESIGNATED BY TRANSMITTING END Subject: Your message was processed error. (MDN)

MIME-Version: 1.0

Content-Type: multipart/report; report-type=disposition-notification; boundary="__boundary__"

In-Replay-To: <111@SHARP_1>

Message-ID: <AAA@SHARP_D1>

(b) MAIN TEXT

--__boundary__

Content-Type: text/plain; charset="US-ASCII"

Content-Transfer-Encoding: 7bit

This is a Return Receipt for the mail that you sent to

"document@sharp.co.jp". on 20 Jun 2002 09:00:00 +0900.

An error occurred while attempting to decode the attached file[s].

(c) MDN RESULT INFORMATION

--__boundary__

Content-Type: message/disposition-notification

Content-Transfer-Encoding: 7bit content-X-From-Request;In-Reply-To ← REQUEST FOR I In-Reply-To Final-Recipient: rfc822;document@sharp.co.jp Original-Message-Id: <111@SHARP_D1> ← RETURN MAIL IDENTIFICATION ID Disposition: automatic-action/MDN-sent-automatically; processed/error Media-Accept-Features: (& (color=Binary)

(image-file-structure=TIFF-limited)

(dpi=200) (dpi-xyratio=[200/100,200/200]) ← RECEPTION CAPABILITY NOTIFICATION (image-coding=[MH])

(MRC-mode=0)

(paper-size=[A4,B4,A3]))

--__boundary__--

FIG. 37

RETRANSMISSION IMAGE MAIL (a) HEADER

Date: 20 Jun 2002 13:00:00 +0900
To: document@sharp.co.jp
From: SHARP D1 InternetFAX <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System In-Repy-To <AAA@SHARP_D1>:<111@SHARP_D1> ← RETURN MESSAGE ID OF RECEIVED MAIL Disposition-Notification-To: Sharp_Doc_InternetFAX@sharp.co.jp MIME-Version: 1.0
Content-Type: multipart/mixed; boundary="SHARP-SmTP-BOUNDARY- A30"
Content-Transfer-Encoding: 7bit
Message-ID:<222@SHARP_D1>

(b) MAIN TEXT

--SHARP-SmTP-BOUNDARY-A30
Content-Type: text/plain; charset=iso-2022-jp
Content-Transfer-Encoding: 7bit DEVICE:SHARP_D1
MODEL:SHARP AR-M450
LOCATION:
FILE FORMAT:TIFF(MH)
RESOLUTION: 200dpi x 200dpi
THE ATTACHMENT IS A SCANNED TIFF IMAGE FILE.

(c) ATTACHMENT FILE

--SHARP-SmTP-BOUNDARY-A30
Content-Type: image/tiff;
 name="SHARP_D1_InternetFAX_20010921_092521.tif"
Content-Transfer-Encoding: base64
Content-Disposition: attachment;
 filename="SHARP_D1_InternetFAX_20010921_092521.tif"

SUkqAAgAAAARAP4ABAABAAAAgAAAAABBAABAAAAwAYAAAEBBAABAAAAJwkAAAIBAwA
AAMBAwABAAAAwAAAAYBAwABAAAAAAAAoBAwABAAAAAgAAABEBBAABAAAACgEAAB

DATA TRANSMISSION DEVICE, DATA TRANSMISSION METHOD, DATA TRANSMISSION PROGRAM, DATA RECEPTION DEVICE, DATA RECEPTION METHOD, DATA RECEPTION PROGRAM, AND COMMUNICATION SYSTEM

FIELD OF THE INVENTION

The present invention relates to a data transmission device in which the reception result of transmission data is confirmed on ground of a reception result notification from a receiving-end machine, and a data reception device which receives the transmission data and returns a reception result notification corresponding to the reception result.

BACKGROUND OF THE INVENTION

Recent development of networking has created new applications for network communication devices for communication over the Internet or like network.

For instance, there are scanner communication devices which can transmit image information read from a document to an external device (e.g. a computer) connected to a network.

As an example of such scanner communication devices, a device having "Scan to Email" function has been developed.

This device converts the image information read from a document to data with a particular format so as to generate an attachment file for e-mail, and transmits an e-mail message including the attachment file to a designated destination (e.g. a host computer) on the Internet.

Also, network facsimile machines (Internet facsimile machines) having printing and telephone functions in addition to the scanner communication function have been developed.

This Internet facsimile machine generates and transmits an e-mail message including an attachment file with image information having been read, and as a received document, the Internet facsimile machine prints (records and outputs) an attachment file of a received e-mail message on a sheet.

Document (1) (Japanese Laid-Open Patent Application No. 2001-274944 (Tokukai 2001-274944; published on Oct. 5, 2001)) discloses a communication system (Internet facsimile system) including such an Internet facsimile machine.

FIG. 38 is a schematic block diagram showing this system. In the Internet facsimile system, when an e-mail message (including an attachment file) is transmitted from an Internet facsimile machine 101 to an Internet facsimile machine 105, first, the Internet facsimile machine 101 transmits (posts) the e-mail massage to a mail server 102 of the Internet facsimile machine 101 itself.

Then the e-mail message posted to the mail server 102 is transferred to a mail server 104 of the Internet facsimile machine 105 via a network 103 and stored in the mail server 104, under a predetermined e-mail transfer protocol such as SMTP (Simple Mail Transfer Protocol).

The Internet facsimile machine 105 regularly accesses the mail server 104, and obtains stored e-mail messages. To obtain the e-mail messages, mail receiving protocols such as a POP3 (Post Office Protocol Version 3) protocol and an IMAP (Internet Message Access Protocol) are used.

Further, the Internet facsimile machine 105 receives an e-mail message and prints the attachment file (image information) thereof, as a received document, and then, in order not to redundantly carry out the reception of the message, typically instructs the mail server 104 to delete the received e-mail message.

However, this Internet facsimile system has the following inherent problem which is not observed in a typical facsimile communication.

That is to say, since a typical facsimile communication realizes a bi-directional real-time communication using a PSTN (Public Switched Telephone Network), a receiving end can easily transmit a reception result notification to a transmitting end, right after the reception of image data.

On the contrary, the transmission of e-mail messages by the Internet facsimile system is a one-way communication from the Internet facsimile machine 101 to the Internet facsimile machine 105, via a server (even if the Internet facsimile machine 105 is in the state of not being able to receive e-mail messages, the transmission from the Internet facsimile machine 101 to the mail servers 102 and 104 is completed anyway).

Thus, to transmit a reception result notification in the Internet facsimile system, the Internet facsimile machine 105 must generate an e-mail message (reception result mail) as a reception result notification and transmit the same to the Internet facsimile machine 101. However, the conventional arrangement does not support such a function of easily generating and transmitting a reception result mail.

For this reason, in the above-mentioned Internet facsimile system, the Internet facsimile machine 101 cannot recognize whether or not the Internet facsimile machine 105 has correctly received an e-mail message, and whether or not image information has properly been printed.

On this account, to confirm the reception of an e-mail message, telephone communication between the users of the Internet facsimile machines 101 and 105 is required after all, and this causes e-mail communication to lose one of its advantages over telephone communication that the parties involved do not need to talk with each other in real time.

To overcome this problem, a scheme is defined by the MDN (Message Disposition Notification) in RFC 2298 which allows an Internet facsimile machine received an e-mail massage to notify a reception result to a transmitting end (i.e. a method of confirming a reception result).

In this method, an Internet facsimile machine of a receiving end notifies a reception result/progress to a transmitting end, using a reception result mail with a predetermined format.

It is noted that "RFCs" (Requests For Comments) are official documents issued by IETF (Internet Engineering Task Force), an Internet-related technology standards organization.

The documents define, for example, specifications and requirements of Internet protocols, such as IP (Internet Protocol), TCP (Transmission Control Protocol), HTTP (Hyper-Text Transfer Protocol), and FTP (File Transfer Protocol), and various Internet-related technologies. They are numbered throughout like "RFC 2298" and publicly available.

According to the MDN defined in the RFC, when the transmission of a reception result mail is desired, an Internet facsimile machine of a transmitting end adds a request (reception result request) for reception result mail to an e-mail message to be transmitted.

The request is added to a "Disposition-Notification-To:" field (MDN field) in a header of the e-mail message.

That is, the Internet facsimile machine of the transmitting end posts an address (usually an address of the device itself) to an MDN field of the e-mail message, in order to set a reception result request. Then the Internet facsimile machine received this e-mail message returns a reception result mail to the address specified in the MDN field.

Note that, such transmission and reception of a reception result mail can be carried out only when the Internet facsimile machines of the transmitting and receiving ends meet the requirement of the MDN (i.e. support the MDN function).

Technology regarding an Internet facsimile machine supporting the MDN function is, for instance, disclosed by Document (2) (Japanese Laid-Open Patent Application No. 2001-309109 (Tokukai 2001-309109; published on Nov. 2, 2001)).

According to this document, after transmitting an e-mail message including a reception result request, an Internet facsimile machine prints out an "unreceived" report, if a reception result mail is not transmitted thereto within a predetermined period of time. With this "unreceived" report, the user of the Internet facsimile machine is notified that the reception result mail is not transmitted from the transmitting end (i.e. the user is notified the occurrence of an error of e-mail transmission (due to the trouble of the communication line)).

With this arrangement, this Internet facsimile machine enables the user to easily recognize whether or not an e-mail message is properly received by a receiving end.

However, in this conventional Internet facsimile machine, when a transmission error or reception error (errors indicating that an e-mail message cannot be properly processed due to the receiving-end machine) occurs for any reason, the e-mail message is not retransmitted in order to prevent the continuous occurrence of errors.

For this reason, the conventional Internet facsimile machine cannot complete the transmission if an error occurs, and this deteriorates the efficiency of the data transmission.

SUMMARY OF THE INVENTION

The present invention is done to solve the above-described problems inherent in the conventional arts. The objective of the present invention is, for instance, to provide a data transmission device which can avoid the reduction of data transmission efficiency, by properly carrying out retransmission when a communication error (e.g. a reception error and transmission error)

To achieve this objective, the data transmission device (present transmission device) of the present invention, in which a reception result of transmission data is confirmed on ground of a reception result notification transmitted from a receiving-end machine, is characterized by comprising: a transmission data generation section which generates the transmission data to be transmitted to the receiving-end machine; and a transmission control section which controls and causes the transmission data generation section to generate the transmission data, and transmits the generated transmission data to the receiving-end machine, when a communication error occurs, the transmission control section causing the transmission data generation section to generate retransmission data with a format different from a format of the transmission data, and retransmitting the retransmission data to the receiving-end machine.

The present transmission device is connected to other communication devices via communication lines such as a LAN (Local Area Network), the Internet, and a public switched telephone network (PSTN).

Then in this transmission device, the transmission control section controls and causes the transmission data generation section to generate transmission data to be transmitted to another communication device, so that the transmission process is carried out.

After transmitting the transmission data, the present transmission device receives a reception result notification, which includes a reception result/progress, from a receiving-end machine with which the present transmission device communicates.

Thus, the present transmission device can determine whether of not the receiving-end machine can properly transmit transmission data, on ground of the reception result notification.

In the present transmission device, in particular, when a communication error occurs, the transmission control section causes the transmission data generation section to generate retransmission data having a format different from a format of the transmission data, and retransmits the retransmission data to the receiving-end machine.

Note that, the communication error includes a transmission error and reception error.

The transmission error indicates that the transmission data cannot be transmitted to the receiving-end machine due to a poor line connection or other reasons.

Meanwhile, the reception error indicates that the receiving-end machine cannot properly receive the retransmission data. The occurrence of this reception error can be easily identified by checking the content of the reception result notification.

Further, the format of the transmission data is, for instance, a data format of transmission data, such as a file format and a resolution, encoding scheme, and size of data.

In other words, the present transmission device attempts to avoid the occurrence of the communication error due to the data format, by altering the data format of the transmission data and retransmitting the same.

With this arrangement, the present transmission device can avoid successive occurrence of the communication errors when the transmission data is retransmitted. Thus, compared to the arrangements in which retransmission is not carried out at all or identical transmission data is retransmitted, the present arrangement can improve the efficiency of data transmission.

Further, a communication system including the present transmission device can carry out efficient data transmission.

The data reception device (present reception device) of the present invention, which receives the transmission data transmitted from the present data transmission device and returns a reception result notification corresponding to the reception result, is characterized by comprising: a storing section which stores information of transmission data having already been received; and a reception control section which determines whether newly-received transmission data is retransmission data of the transmission data having already been received or initial transmission data being different from the retransmission data, on ground of the information stored in the storing section.

In the present reception device, the information of the transmission data having already been received is stored in the storing section. Note that, the information of transmission data is, for instance, information peculiar to each set of transmission data, such as transmission data itself, an ID indicating transmission data, date and time of transmission, transmitting party, reception result, and identifier (e.g. Ref. No.) attached to each set of transmission data.

Further, as described above, the present transmission device retransmits transmission data, when a communication error occurs.

Then, in the present reception device, the transmission control section compares the information of newly-arrived transmission data (newly-arrived data) with the information of transmission data having been stored in the storing section, and determines whether the newly-arrived data is retransmission data of the transmission data having already been received or initial transmission data.

Note that, the initial transmission data is transmission data which is received by the present reception device for the first time (on this occasion, the reception result is not taken into consideration; i.e. the initial transmission data is transmission data not corresponding to the transmission data which have already been received).

With this arrangement, the present reception device can manage the related sets of transmission data, in a systematic manner. For instance, the present reception device can easily determine whether or not the retransmission data concerning the initial transmission data having been failed to process is received (the user can easily make this determination, too).

Further, for instance, after the confirmation of the reception of the retransmission data, it is possible to take measures such as the deletion of the initial transmission data concerning the retransmission data and related information of this initial transmission data, from the storing section.

Moreover, a communication system including the above-mentioned present reception device and present transmission device can efficiently carry out data transmission.

For a fuller understanding of the nature and advantages of the invention, reference should be made to the ensuing detailed description taken in conjunction with the accompanying drawings.

BRIEF DESCRIPTION OF THE DRAWINGS

FIG. 5 illustrates an example of an image mail generated by an e-mail generation section of the digital multifunction device in FIG. 3.

FIG. 6 illustrates an example of a reception result mail which is returned in accordance with the image mail in FIG. 5.

FIG. 8 illustrates an example of a short number list stored in an address storage section of the digital multifunction device in FIG. 3.

FIG. 11 illustrates another example of an image mail generated by the e-mail generation section of the digital multifunction device in FIG. 3.

FIG. 12 illustrates an example of a reception result mail transmitted in accordance with the image mail in FIG. 11.

FIG. 13 illustrates an example of an image mail retransmitted in accordance with the reception result mail in FIG. 12.

FIG. 14 illustrates an example of a reception result mail transmitted in accordance with the image mail in FIG. 13.

FIG. 17 illustrates an example of an image mail transmitted and received in the process in FIG. 16.

FIG. 18 illustrates an example of a reception result mail transmitted in accordance with the image mail in FIG. 17.

FIG. 19 illustrates an example of an image mail retransmitted in accordance with the reception result mail in FIG. 18.

FIG. 20 illustrates an example of a reception result mail transmitted in accordance with the image mail in FIG. 19.

FIG. 21 illustrates an example of an image mail retransmitted in accordance with the reception result mail in FIG. 20.

FIG. 22 illustrates an example of a reception result mail transmitted in accordance with the image mail in FIG. 21.

FIG. 25 illustrates an example of an initial image mail transmitted and received by a communication system in accordance with an embodiment of the present invention.

FIG. 26 illustrates an example of a reception result mail transmitted in accordance with the initial image mail in FIG. 25.

FIG. 27 illustrates an example of a retransmission image mail retransmitted in accordance with the reception result mail in FIG. 26.

FIG. 29($a$) through FIG. 29($c$) illustrate an example of a communication management table stored in the digital multifunction device in FIG. 3.

FIG. 30 illustrates an example of a reception result mail transmitted in accordance with the retransmission image mail in FIG. 27.

FIG. 31($a$) and FIG. 31($b$) illustrate a result of conventional communication management.

FIG. 32 illustrates am example of a communication management report generated by and displayed on the digital multifunction device in FIG. 3.

FIG. 33 illustrates an example of an initial image mail transmitted and received in a communication system in accordance with an embodiment of the present invention.

FIG. 34 illustrates an example of a reception result mail transmitted in accordance with the retransmission image mail in FIG. 33.

FIG. 35 illustrates an example of a retransmission image mail retransmitted in accordance with the reception result mail in FIG. 34.

FIG. 36 illustrates another example of a reception result mail transmitted in accordance with the retransmission image mail in FIG. 33.

FIG. 37 illustrates an example of a retransmission image mail in accordance with the reception result mail in FIG. 36.

DESCRIPTION OF THE EMBODIMENTS

First Embodiment

The following will describe one embodiment of the present invention.

A communication system according to the present embodiment (present system) is a wide area network system in which multiple LANs (Local Area Network) are connected over the Internet and the public switched telephone network (PSTN), including many devices such as terminal device capable of the Internet Fax communication (Internet facsimile machine) and e-mail server.

In the present system, each of the Internet facsimile machines has a MDN (Message Disposition Notification) function, so that the Internet Fax communication can be carried out among the Internet facsimile machines through the use of the MDN function.

Here, the Internet Fax communication (hereinafter referred to as INF communication) is a communication method of transmitting and receiving an e-mail message including image data of the original document captured (scanned). In the INF communication, printing image data included in an incoming e-mail message completes the communication.

The MDN provides a method in which the Internet facsimile machine that has received an e-mail message in the INF communication notifies the transmitting end of a reception result (a method of checking on a reception result). With the MDN, the receiving-end Internet facsimile machine notifies the transmitting end of a reception result/progress via a reception result mail with a predetermined format.

If a delivery of the reception result mail is desired, the transmitting-end Internet facsimile machine sets a request for a reception result mail (reception result request) to an outgoing e-mail message (transmission data).

An Internet facsimile machine that has received the e-mail message to which the reception result request is set returns a reception result mail including a reception result (whether the image data of the e-mail message has been printed out, and other information) to the transmitting-end Internet facsimile machine.

Note that, transmission/reception of such a reception result mail can be performed, provided that the Internet facsimile machines at the transmitting and receiving ends meet the specification of the MDN (they have the MDN function).

Hereinafter, an e-mail message including image data that is transmitted and received in the INF communication is referred to as image mail.

Further, an Internet facsimile machine that transmits an image mail in the INF communication is referred to as transmitting-end machine. An Internet facsimile machine that receives an image mail and transmits a reception result mail including the reception result of the image mail is referred to as receiving-end machine.

Figure 2:
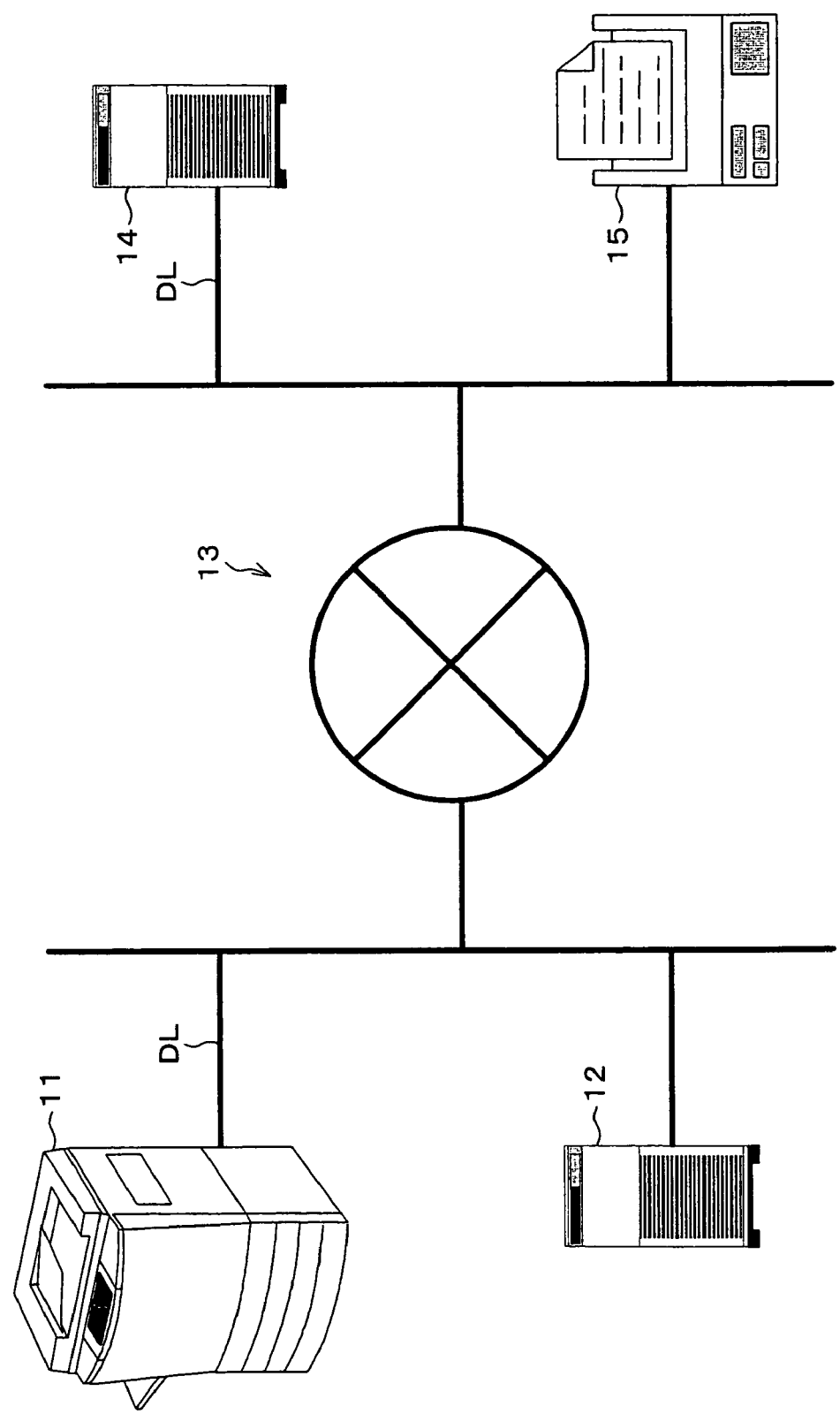
FIG. 2 illustrates an arrangement of the above-mentioned communication system.

FIG. 2 is an explanatory view schematically showing a structure of the present system. As illustrated in FIG. 2, the present system is made up of digital multifunction devices 11 and 15, which are Internet facsimile machines, connected to each other via LAN, servers 12 and 14, and Internet 13.

The servers 12 and 14, which are e-mail servers of the digital multifunction devices 11 and 15, respectively, are connected to each other via the LAN realized by digital lines.

The digital multifunction device 11 includes the following functions: the copy function of printing image data captured by its own scanner section onto a sheet (recording medium); the printer function of printing image data inputted from an external device onto a sheet; and the ordinary facsimile communication (ordinary fax communication) function using telephone lines.

The digital multifunction device 11 also has a function of performing the INF communication via the LAN, the server 12, and the Internet 13 (INF communication function).

The digital multifunction device 11 is subjected to setting to any one of the following communication modes: copy mode; printer mode; normal FAX mode; and INF communication mode, in accordance with instructions inputted by the user. The digital multifunction device 11 is set so as to develop the copy function, the printer function, the normal FAX function, or the INF communication function in each of the communication modes.

Note that, the digital multifunction device 15 includes all the functions of the digital multifunction device 11. The following will therefore only describe the digital multifunction device 11 as the Internet facsimile machine in the present system.

The following will give a brief description of the operation related to the INF communication in the digital multifunction device 11. This operation has a transmission operation and a reception operation.

That is, in the transmission operation, the digital multifunction device 11 prepares an image mail using image data of the original document captured by a scanner and an e-mail address of the receiving-end machine. Then, the digital multifunction device 11 transmits the prepared image mail to the transmitting-end machine via the server 12 and the Internet 13.

Meanwhile, in the reception operation, the digital multifunction device 11 periodically accesses the server 12 to retrieve the image mail that is addressed to it and print the image data of the retrieved image mail. Then, the digital multifunction device 11 prepares a reception result mail including a printing result (or a reception result) and transmits the prepared reception result mail to the transmitting-end machine.

Next, the following will give a detailed description of a structure of the digital multifunction device 11.

Figure 3:
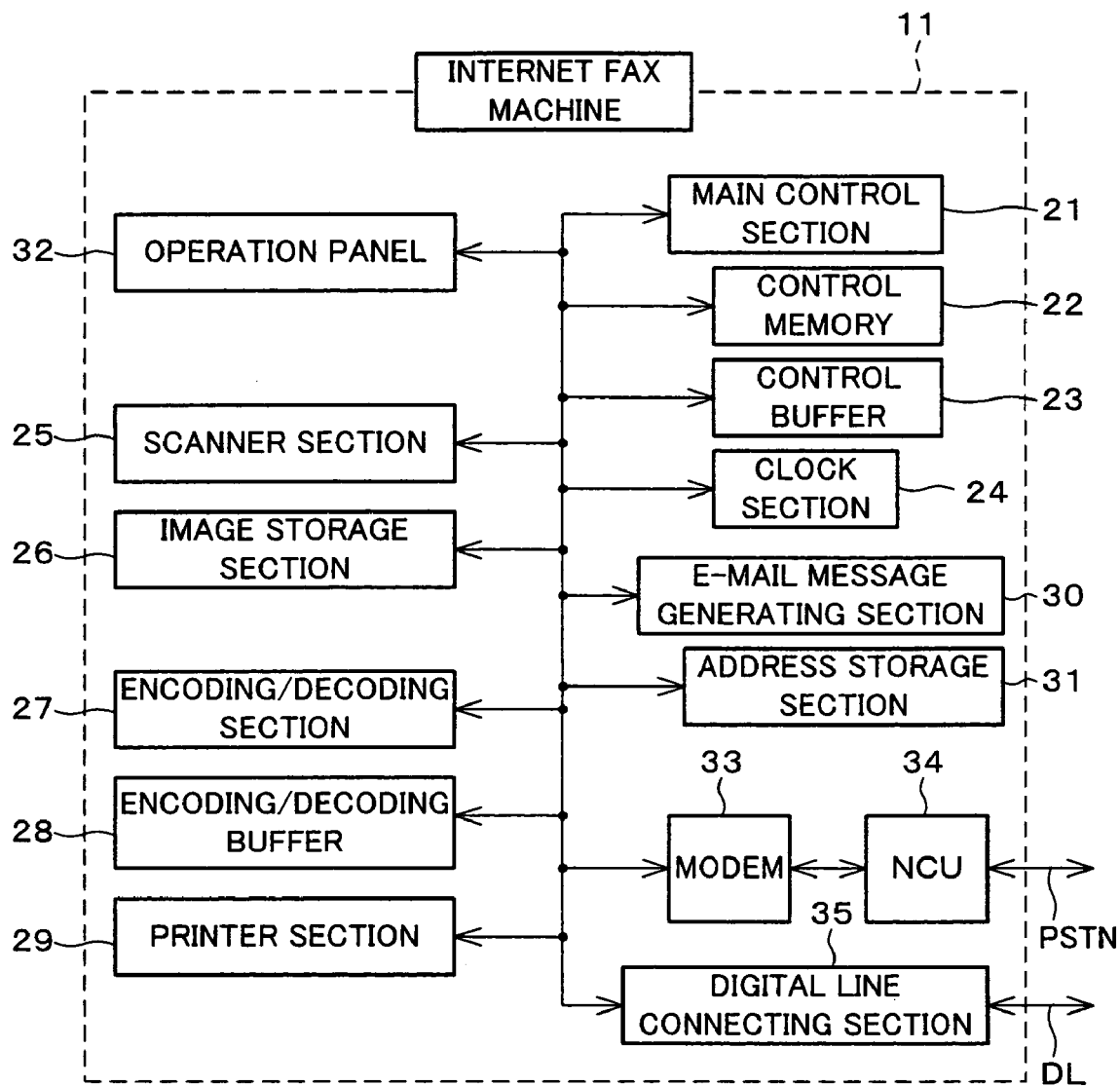
FIG. 3 is a block diagram, illustrating a control structure (electrical structure) of the digital multifunction device of the communication system in FIG. 2.

FIG. 3 is a block diagram showing a control structure (electrical structure) of the digital multifunction device 11.

As illustrated in FIG. 3, the digital multifunction device 11 is primarily made up of a main control section 21, a control memory 22, a control buffer 23, a clock section 24, a scanner section 25, an image storage section 26, an encoding/decoding section 27, an encoding/decoding buffer 28, a printer section 29, an e-mail message generating section 30, an address storage section 31, an operation panel 32, a modem 33, an NCU (Network Control Unit) 34, and a digital line connection section 35.

The main control section 21, which is a control device made up of an MPU (Micro Processor Unit), a CPU (Central Processing Unit), and other components, is a brain of the digital multifunction device 11 to control the overall operation of the digital multifunction device 11.

Especially, the main control section 21 has a function of controlling other components 22 through 35 to perform the INF communication (described later).

The control memory 22 provides a means of storing control programs used by the main control section 21 and is made up of ROM (Read Only Memory) or other nonvolatile memory, or backed-up volatile memory, and related devices.

Note that, information on the receiving-end machine which is set before data and an image mail is transmitted in the ordinary facsimile communications and the INF communication (facsimile number, e-mail address) is stored in the control memory 22.

The control buffer 23 provides a primary storage section (temporary storage section) used by the main control section 21 and is made up of RAM (Random Access Memory), and related devices. The control buffer 23 has a function of storing data required for the execution of the control programs by the main control section 21.

Further, the main control section 21 causes the control buffer 23 to read the control programs stored in the control memory 22 before using the control programs.

The clock section 24 is a time measuring equipment used by the main control section 21 for the transmission operation of an e-mail message in the INF communication (described later).

The scanner 25 is a scanner including charge coupled devices (CCDs), capturing a document image at a predetermined resolution for image data (dot image data) output.

The encoding/decoding section 27 encodes (encodes/compresses) image data fed from the scanner section 25 and decodes incoming encoded/compressed image data to restore the original data.

Note that, the encoding/decoding section 27 can use encoding schemes commonly used in facsimile communications, such as MH (Modified Huffman), MR (Modified READ), and MMR (Modified Modified READ).

The image storage section 26 stores encoded or decoded image data, image data fed from the scanner section 25, and incoming image data.

The encoding/decoding buffer 28 is made up of RAM and related devices, offering temporary storage in the encoding and decoding (compression and decompression) of image data by the encoding/decoding section 27.

The printer section 29 includes an electrophotographic printing machine, making a print (hard copy; printout) of data, such as image data fed from the scanner section 25 and incoming image data.

The e-mail message generating section 30 generates an image mail used in the INF communication, using encoded image data and header information that will be described later (including an address of the receiving-end machine).

The address storage section 31 stores information on the receiving-end machines (addresses, telephone numbers, short numbers, etc. of the receiving-end machine) in the form of a short number list described later and is made up of nonvolatile memory, or backed-up volatile memory, and related devices.

The operation panel 32 includes an input section including a numeric keypad and a touch panel and a display section which is made up of LCD (Liquid Crystal Display) (both described later). The operation panel 32 has functions of receiving instructions inputted by the user and transferring them to the main control section 21 and of showing a screen display in accordance with the control of the main control section 21, using the input section and the output section. The operation panel 32 is set so as to receive an address of the receiving-end machine which is inputted by the user.

Note that, a specific structure of the operation panel 32 will be described later.

The digital line connection section 35 is a means of connecting the digital multifunction device 11 to a digital line DL for the transmission and reception of an e-mail message and the INF communication via the Internet 13.

The modem 33 provides a means of performing ordinary facsimile communications and is made up of a facsimile modem capable of facsimile communications. The modem 33 is connected to an analog public switched telephone network (PSTN) via the NCU 34.

The NCU 34 is hardware implementing line control operation by closing and opening a line between the modem 33 and the PSTN. Specifically, the NCU 34 is a means of connecting the modem 33 to the PSTN where necessary.

The following will describe a structure of the operation panel 32.

Figure 4:
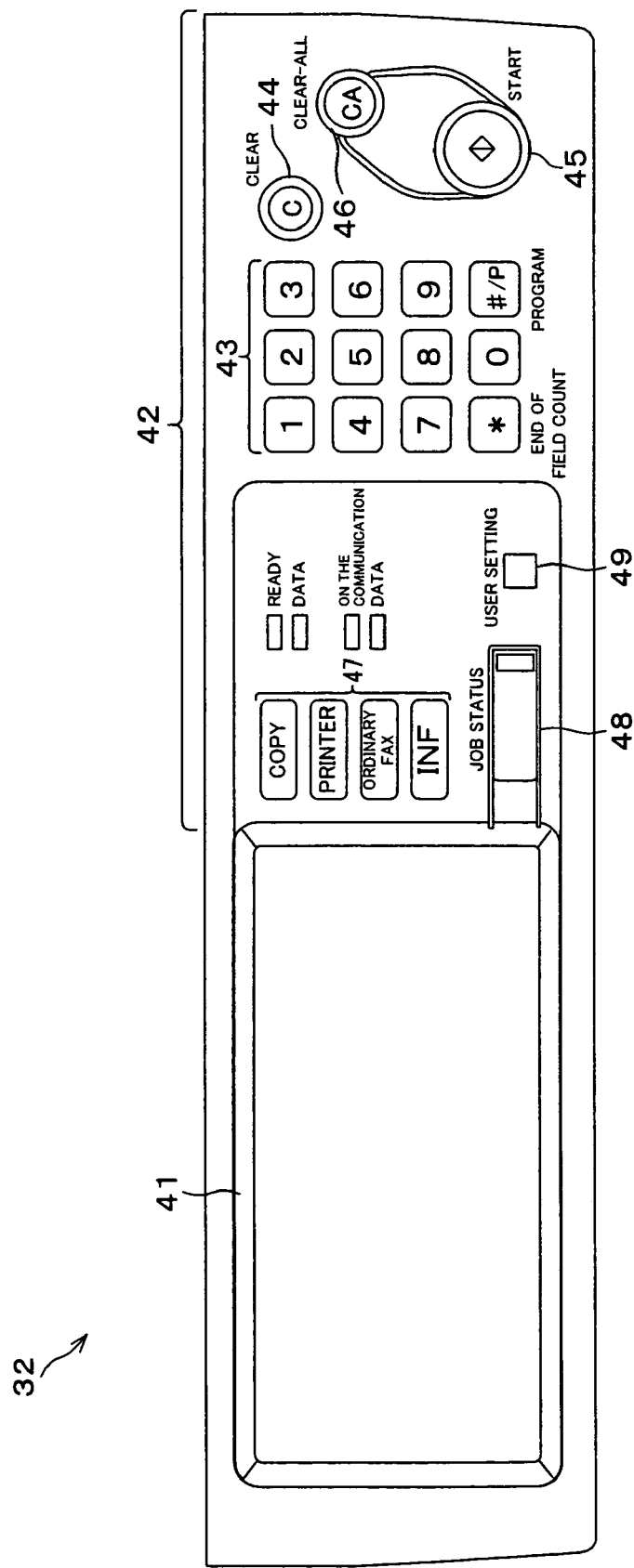
FIG. 4 illustrates an arrangement of an operation panel of the digital multifunction device in FIG. 3.

FIG. 4 is an explanatory view showing a structure of the operation panel 32. As illustrated in FIG. 4, the operation panel 32 includes a display section 41 and an input section 42 which are constructed into an integrated touch panel console.

The display section 41 is made up of a liquid crystal display (LCD) and is a means of displaying an operation status of the digital multifunction device 11 and information on the ordinary facsimile communication and the INF communication (information on the receiving-end machine and other information). The display section 41 is set so as to display numbers, symbols, and images.

The input section 42 is a means of accepting settings to the digital multifunction device 11 by the user, instructions for altering conditions, and inputted instructions for proceeding with the operation of the digital multifunction device 11, having various keys (input means) required to input instructions.

Specifically, as illustrated in FIG. 4, the input section 42 includes a numeric keypad 43, a clear key 44, a start key 45, a clear-all key (CA key) 46, mode selection keys 47, a job status display key 48, and a user settings key 49.

The display section 41 is a touch panel which displays various keys and receives input of settings through them from the user.

The numeric keypad 43 of the input section 42 is a keypad to set operating conditions of the digital multifunction device 11. That is, using the numeric keypad 43, the user can input the number of copies to be made in the copy mode and the printer mode and a facsimile number or address in the ordinary facsimile mode and the INF communication mode.

The clear key 44 provides a means of clearing the input (the last input) through the numeric keypad 43.

The clear-all key 46 is a key to clear all the user-specified conditions.

The start key 45 is a key to start the operation of the digital multifunction device 11 in each of the communication modes. That is, it is set such that, through the start key 45, the user can make instructions for a start of printing in the copy mode and the printer mode and for a start of data transmission in the ordinary facsimile mode and the INF communication mode.

The mode selection keys 47 are means of changing the communication mode among the four modes (copy, printer, ordinary facsimile, INF communication) of the digital multifunction device 11.

The job status display key 48 is a key to display the current print job (image forming job) status in each of the communication modes. When the job status display key 48 is pressed, waiting print jobs and a print job currently being processed are displayed on a touch panel of the display section 41. Through the input on the touch panel, the user can control the progress of the jobs (canceling, suspending, and deleting of jobs, change of processing order, etc.).

The user settings key 49 is a key to edit a short number list described later.

Here, the following will describe the INF communication in the digital multifunction device 11.

The digital multifunction device 11 is a device having the MDN function related to the INF communication. That is, in the INF communication of the digital multifunction device 11, under the control of the main control section 21, the e-mail message generating section 30 generates an image mail including image data encoded by the encoding/decoding section 27. Then, the e-mail message generating section 30 sets a request for reception result (reception result request) to the generated image mail.

FIG. 5 is an explanatory view showing an example of an image mail (outgoing mail) generated by the e-mail message generating section 30.

As illustrated in FIG. 5, an image mail is made up of a header (a), a main text (b), and an attachment file (c). In actuality, the image mail is not divided into (a) through (c). For convenience of description, the image mail is so divided herein.

The header (a) is an area including formative unique information (header information) in the image mail. Table 1 briefly shows the contents of items in the header (field; information described in each line of the header).

TABLE 1

| | |
|---|---|
| Date | Information on date and time at the transmission of e-mail |
| Message-ID | ID to identify outgoing mail |
| From | Mail address of transmitting-end machine |
| To | Mail address of receiving-end machine |
| Subject | Title of outgoing mail |
| X-Mailer | Information on an e-mail software |
| MIME-Version: 1.0 | Version information on MIME |
| Disposition-Notification-To | Request for reception result mail, transmission destination |
| Content-Type | Designation for structure of main text and character code |
| Content-Transfer-Encoding: 7 bit | Designation for expressions of MIME |
| Reply-To | Address to designate the destination of return message |

Here, a Disposition-Notification-To field (MDN field) is a field defined by the MDN (RFC 2298) and is a field to set a necessity of transmitting a reception result mail and an address of a machine to which a reception result mail is to be transmitted (usually, transmitting-end machine) ("Sharp_Doc_InternetFAX@sharp.co.jp" in an example of FIG. 5).

That is the e-mail message generating section 30 fills an address of the digital multifunction device 11 in the MDN field to set a reception result request.

Other Internet facsimile machine (digital multifunction device 15, or other device) that receives this e-mail message returns a reception result mail to an address as designated in the MDN field.

A Message-ID field is a field to identify each image mail. For example, when Message-ID of the image mail is designated as <111@SHARP_D1>, <111@SHARP_D1> is indicated in the Original-Message-ID field of MDN result information in a reception result mail. This can identify an image mail corresponding to the reception result mail.

The main text (b) corresponds to a so-called body of an e-mail message. Since the transmission of image data is a main object of the image mail in the INF communication, this main text is used secondarily for the transmission and reception of a simple message.

The attachment file (c) is a file that is attached to the main text of the image mail and is made up of encoded image data. A format of this attachment file (attachment format) is defined as MIME (Multipurpose Internet Mail Extensions).

FIG. 6 is an explanatory view showing an example of a reception result mail which is returned in accordance with the above-described image mail.

As illustrated in FIG. 6, as with the image mail shown in FIG. 5, a reception result mail includes a header (a) and a main text (b). The reception result mail is arranged so as to have MDN information (c). Note that, as with the image mail, in actuality, the reception result mail is not divided into (a) through (c). For convenience of description, the reception result mail is so divided herein.

The header (a) and the main text (b) are similar to those of the image mail shown in FIG. 5. Note that, the Disposition-Notification-To field (MDN field) is not included in the header of the reception result mail. In addition, a message indicating that the reception has succeeded, and the like is described in the main text.

MDN information (c) (information for use in the MDN) includes data that is desired to be obtained by a transmitting-end machine. The content of each item (field) in the MDN information is given briefly.

A Final-Recipient field is an item indicating an address of a receiving-end device (sender of a reception result mail).

An Original-Message-Id is ID to identify which image mail a reception result mail corresponds to. For example, the Original-Message-Id serves as an identification of a reception result mail, which is used to indicate that a reception result mail corresponds to the Message-Id field shown in FIG. 5(a).

A Disposition field is an item to describe a reception result of an e-mail message. Note that, the Disposition field in FIG. 6(c) indicates that a reception operation has been completed in good condition.

A Media-Accept-Features field is a field to indicate the processing capability (receiving and printing capabilities) of a receiving-end machine.

For example, in an example shown in FIG. 6(c), a receiving-end machine is set as follows: monochrome images are displayed (printed) (color=Binary); only TIFF-format images are captured (image-file-structure=Tiff-limited); images are displayed in resolution of 200 dpi (dpi=200); images with an aspect ratio of 200:100 or 200:200 are displayed (dpi-xyratio=[200/100,200/200]; encoding schemes, MH, MR and MMR are supported (image-coding=[MH, MR, MMR]); an MRC (Mixed Raster Content) mode is set at 0 (in case of zero, images with different encoding schemes and different resolutions included within a single page are not permitted; MRC-mode=0); and A4, B4, or A3-sized sheets are used (paper-size=[A4,B4,A3]).

In the present system in which the above-described image mail and reception result mail are transmitted and received, when the digital multifunction device 11, a transmitting-end machine, receives a reception result mail indicating a failed reception of an e-mail message from a receiving-end machine, or when the digital multifunction device 11 has not received a reception result mail, the main control section 21 determines that an error has occurred in the INF communication.

Then, the main control section 21 controls and causes the encoding/decoding section 27 and the e-mail message generating section 30 to alter an image format of image data to be attached in accordance with a processing capability indicated in the reception result mail so that an image mail including this image data is retransmitted. This arrangement is set so that a new image mail available for the receiving-end machine's processing can be retransmitted.

Here, a detailed description will be given on the basis of a flow of a transmission operation of an e-mail message in the INF communication under the control of the main control section 21.

Figure 1:
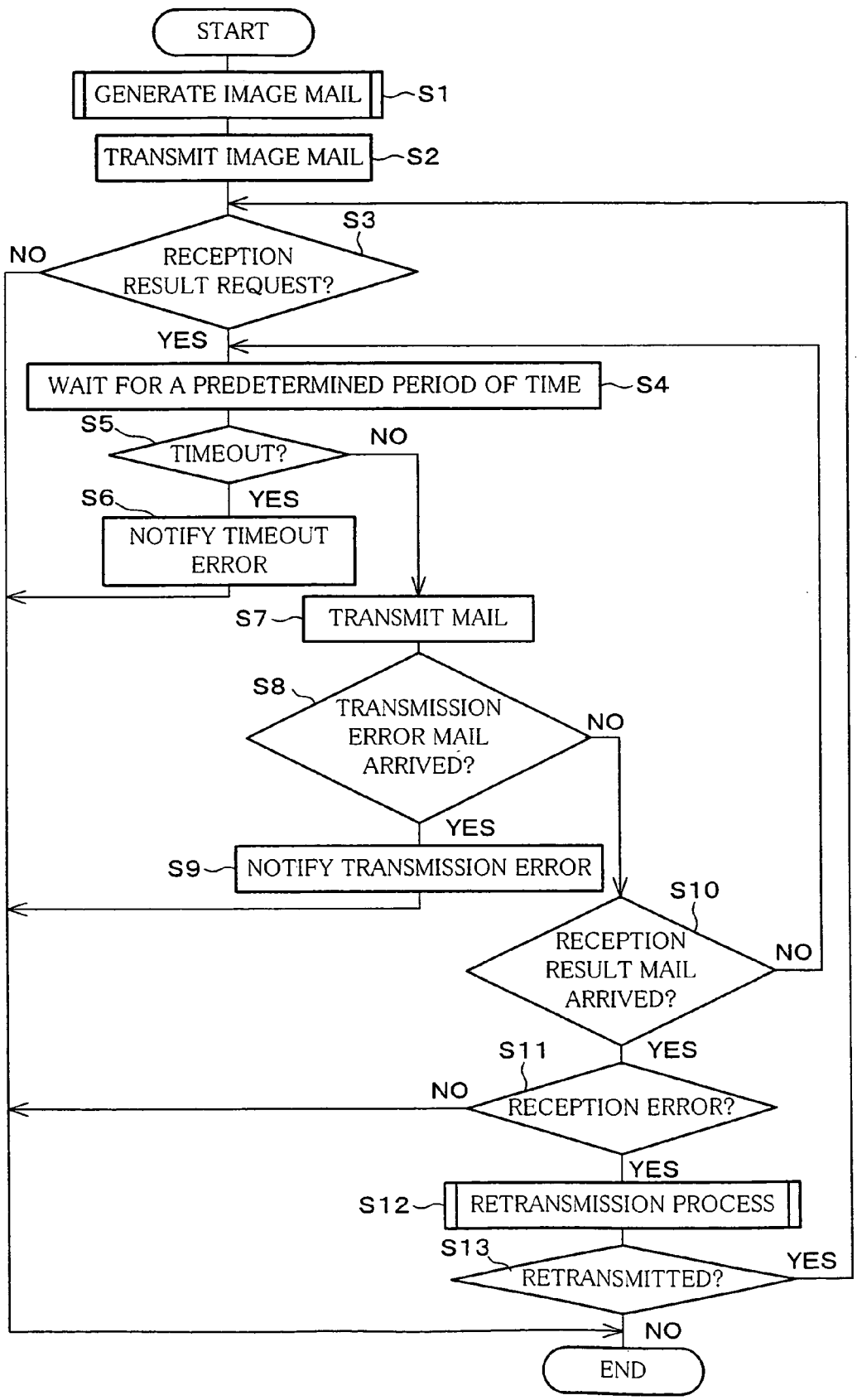
FIG. 1 is a flow chart, illustrating the process of transmitting an e-mail message under an INF communication, which is controlled by a main control section of a digital multifunction device in a communication system in accordance with an embodiment of the present invention.

FIG. 1 is a flowchart of the transmission operation.

In the transmission operation, by the user, an original document is placed on the scanner section 25, and an address of a receiving-end machine, transmission conditions, and others are inputted through the operation panel 32.

In response to this, the main control section 21 controls and causes the scanner section 25 to read a document image and generate image data, and the main control section 21 controls and causes the e-mail message generating section 30 to generate an image mail (image mail generation process; S1).

Note that, the image mail generation process in S1 will be described later.

Next, the main control section 21 causes the digital line connection section 35 to connect between the digital multifunction device 11 and the Internet (server 12) so as to transmit the image mail generated by the e-mail message generating section 30 (S2).

Thereafter, the main control section 21 temporarily terminates the connection to the server 12.

Next, the main control section 21 determines whether a reception result request is set to the image mail transmitted in S2 (S3). Then, if the reception result request is not set, the process is terminated.

On the other hand, if the reception result request is set, the main control section 21 controls and causes the clock section 24 to start measuring a waiting time before the arrival of a reception result mail (standby time).

Then, after waiting for a predetermined period of time (S4), the main control section 21 determines whether a standby time has passed a predetermined time limit (whether a timeout has occurred) (S5). When a timeout has occurred, the main control section 21 causes the clock section 24 to terminate a time measurement, and after the main control section 21 notifies (informs) the user of a timeout error through the display section 41 of the operation panel 32 (S6), the process is terminated.

When a timeout has not occurred, the main control section 21 causes the digital multifunction device 11 to connect to the Internet (server 12) so as to receive a newly-arrived mail, if any, and the connection to the Internet is terminated (S7).

Thereafter, the main control section 21 determines whether a transmission error mail has been received (S8). Note that, the transmission error mail is a mail to notify that an image mail could have not been transmitted from the server 12 onward due to a poor line connection, or other reasons (a transmission error has occurred). The transmission error mail is transmitted from the server 12, the server 14, or a server in the Internet 13 relaying an e-mail to the server 14.

Then, when having received a transmission error mail, the main control section 21 notifies the user of a transmission error through the display section 41 of the operation panel 32 (S9), the process is terminated.

When determining that a transmission error mail has not been received, the main control section 21 determines whether a reception result mail has been received (S10). If the reception result mail has not been received, the process goes back to S4.

When a reception result mail has been received, the main control section 21 analyzes the content of the received reception result mail and determines the presence or absence of a reception error (S11). The reception error is an error indicating that the processing of an image mail (the processes through the printing process of image data) has not been completed in the receiving-end machine.

The presence or absence of the reception error can be determined by checking the content of the Disposition field shown in FIG. 6(c) in the reception result mail.

Then, when determining that there is no reception error, the main control section 21 terminates the process.

On the other hand, if there is any reception error, that is, if image data has not been printed on the receiving-end machine, a retransmission process described later is performed (S12). Then, if a retransmission of an image mail has been actually carried out, the process goes back to S3. If not, the process is terminated (S13)

Figure 7:
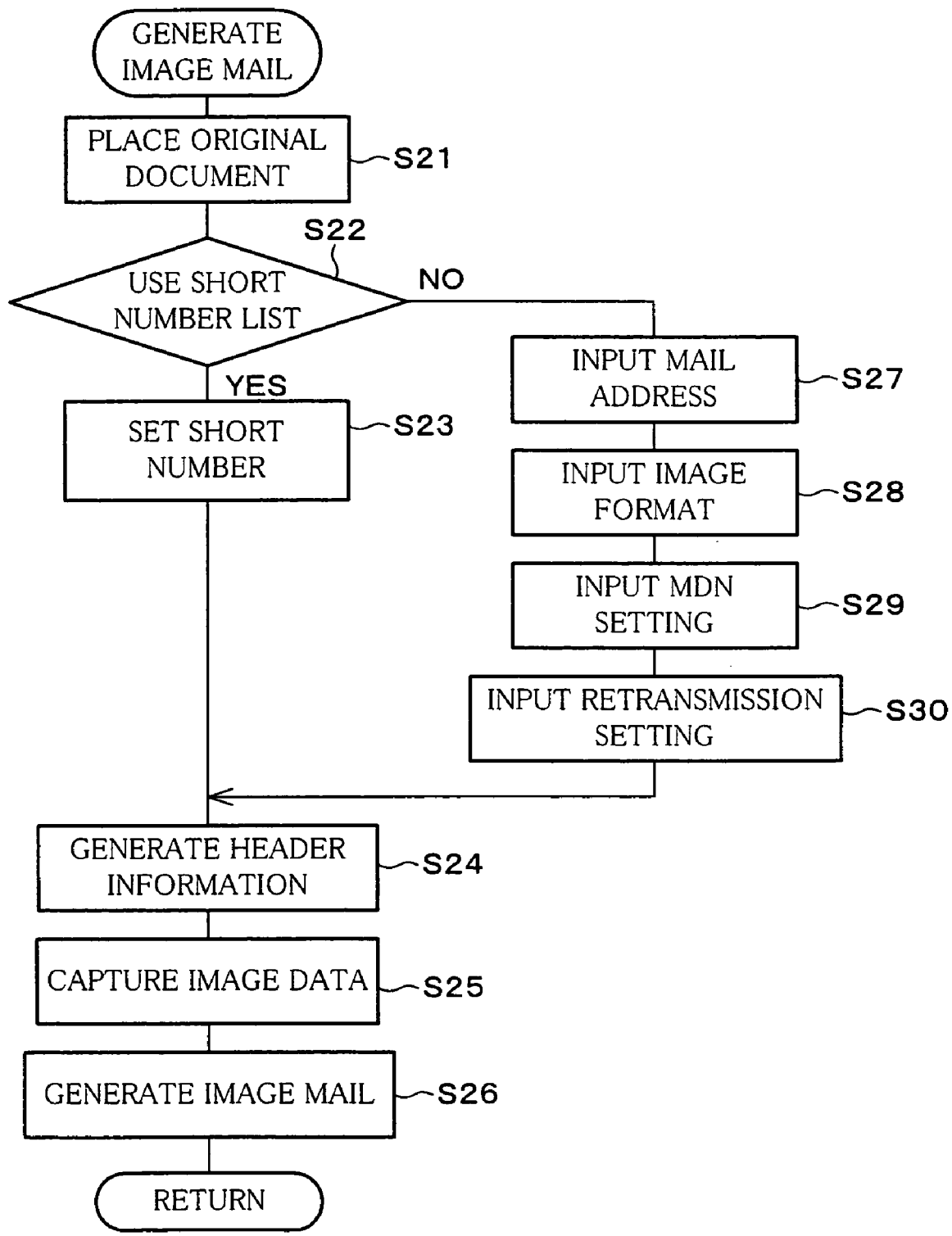
FIG. 7 is a flow chart, illustrating the process of image mail generation, shown as S1 in FIG. 1.

Next, the following will give a description of the image mail generation process, shown as S1 in FIG. 1. FIG. 7 is a flowchart showing a flow of the image mail generation process.

As illustrated in FIG. 7, in the image mail generation process, by the user, an original document on which images to be attached to an e-mail message are drawn is placed on the scanner section 25 (S21).

Thereafter, the user determines whether to use a short number list stored in the address storage section 31 (S22).

FIG. 8 is an explanatory view showing an example of the short number list. As illustrated in FIG. 8, the short number list is a list to set receiving-end machines (destinations) and their e-mail addresses, respectively corresponding to the respective short numbers (one touch numbers).

With the list, the following items: file format, compression format, reception result request, standby time, the number of times to be retransmitted, and alteration in format upon retransmission can be set for each of the receiving-end machines.

Here, the file format and the compression format are those to set an image format for image data included in an e-mail message.

That is, the file format is a file format for image data, such as TIFF and PDF. The compression format is a format to compress image data, such as MH, MMR, and the like.

The reception result request and the time limit are items for setting related to the MDN (MDN setting).

That is, the reception result request is an item to set whether a return of a reception result mail is to be requested to a receiving-end machine (whether a reception result request is to be made). The time limit is an item to specify a timeout shown in S14 of FIG. 1, and the time limit can be set between 1 to 240 minutes.

The number of times to be retransmitted and the alteration in format at the time of retransmission are items for settings related to the retransmission process (retransmission setting) described later.

That is, the number of times to be retransmitted is an item to set the number of times to retransmit an image mail. The alteration in format upon retransmission is an item to set whether an image format is to be altered when an image mail is retransmitted.

Thus, with the digital multifunction device 11, the image format setting, the MDN setting, and retransmission setting for an image mail can be determined in advance for a receiving-end machine that frequently receives an e-mail message.

In the case where the user determines to use the short number list in S22 shown, in FIG. 7, the user determines a receiving-end machine and its image format setting, MDN setting, and retransmission setting by inputting the corresponding short number or one touch number through the numeric keypad or one touch key (not shown) on the operation panel 32 (S23).

In response to this, the main control section 21 controls and causes the e-mail message generating section 30 to generate a header (header information) of an image mail (S24).

Upon the press of the start key 45 on the operation panel 32 by the user, the main control section 21 controls and causes the scanner section 25, the image storage section 26, the encoding/decoding section 27, and the encoding/decoding buffer 28 to capture an image of an original document and generate its image data (S25).

Thereafter, the main control section 21 controls and causes the e-mail message generating section 30 to generate an image mail as illustrated in FIG. 5 using the header that has been generated in S24 and the image data that has been generated in S25 (S26), and the image mail generation process is ended.

If the user determines not to use the short number in S32, the user inputs an e-mail address, an image format, an MDN setting, and a retransmission setting of the receiving-end machine, which is a destination of the e-mail message, through the input section 42 of the operation panel 32 (S27 through S30). Thereafter, the main control section 21 proceeds with the process in S24 described above.

Figure 9:
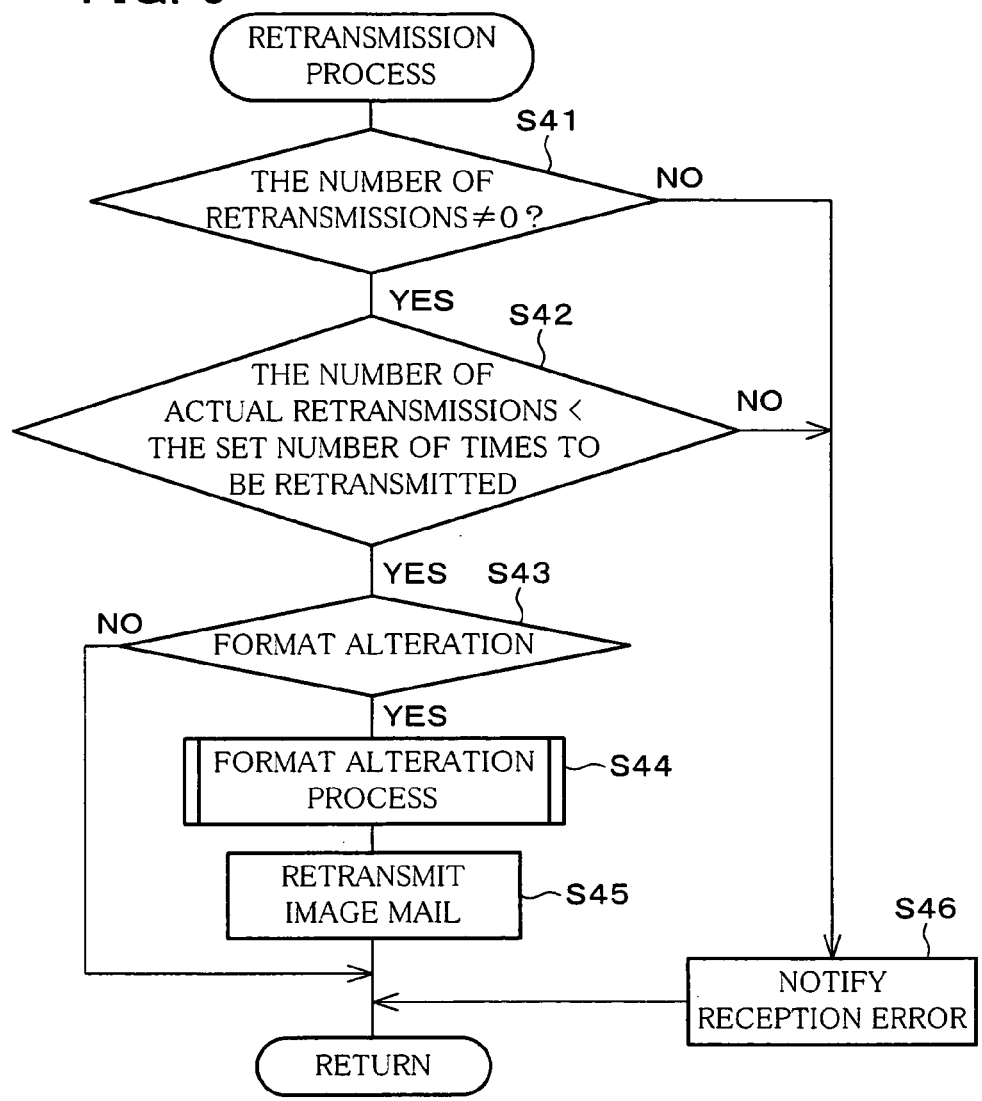
FIG. 9 is a flow chart, illustrating the retransmission process which is shown as S12 in FIG. 1.

Next, the following will describe the retransmission process shown in S12 in FIG. 1. FIG. 9 is a flowchart showing the flow of this process.

As illustrated in FIG. 1, in the retransmission process, the main control section 21 determines whether the setting for retransmission has been made to the image mail (S41). Note that, this determination is made by checking whether the number of retransmissions is 0 or not in the retransmission setting of the image mail.

Then, if determining that the setting for retransmission has not been made, the main control section 21 notifies the user of a reception error through the display section 41 of the operation panel 32 (S46). Thereafter, the process is terminated.

If determining the setting for retransmission has been made, the main control section 21 determines whether the number of times the retransmission has been made up to the present (the number of actual retransmissions) is less than the number of times to be retransmitted (a selected number of times to be retransmitted) (S42).

If the number of actual retransmissions is equal to the selected number of times to be retransmitted, the main control section 21 notifies the user of a reception error through the display section 41 of the operation panel 32 (S46). Thereafter, the process is terminated.

If the number of actual retransmissions is less than the selected number of times to be retransmitted, the main control section 21 checks the presence or absence of alteration in the image format (format alteration) (S43).

Then, if the format alteration has been set to "No", the image mail transmitted in S2 of FIG. 1 is retransmitted without any alteration of the image format (S45), and the process is terminated.

If the format alteration has been set to "Yes", the main control section 21 performs format alteration process described later to alter the image format of the image mail (S44). Then, the image mail including the image data that has been altered in its image format is transmitted (S45), and the process is terminated.

Figure 10:
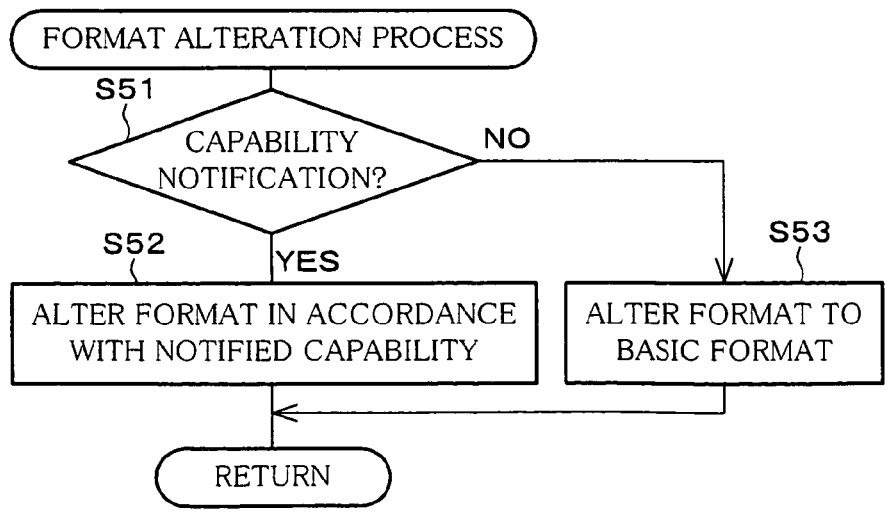
FIG. 10 is a flow chart, illustrating the process of format alteration, which is shown as S44 in FIG. 9.

Here, the format alteration process shown as S44 of FIG. 9 will be described. FIG. 10 is a flowchart showing the flow of this process.

As illustrated in FIG. 10, in this process, the main control section 21 determines whether the processing capability (receiving and printing capabilities) of the receiving-end machine is indicated in the reception result mail (S51).

Note that, this determination is made by checking whether a Media-Accept-Features field shown in FIG. 6(*c*), which is a field indicating this capability, and the content of the Media-Accept-Features field.

If the processing capability is indicated in the reception result mail, the main control section 21 alters the image format of the image mail into a format in accordance with the processing capability of the receiving-end machine (S52), and the process is terminated.

If the processing capability is not indicated in the reception result mail, the main control section 21 alters the image format of the image mail into a basic format (S53), and the process is terminated.

Here, the image data of the basic format is image data which can be processed by TIFF ProfileS (defined by IETF), which is a processing capability minimally provided in the Internet facsimile machine. Specifically, the image data of the basic format, which is image data which is an attached data in the MIME format, is image data of: 1728 horizontal pixels, 200×100 dpi (or 200×200 dpi) resolutions, and MH-encoding.

Here, an example in the above transmission process will be described with reference to FIG. 11 through FIG. 14.

That is, assume that the digital multifunction device 11 as a transmitting-end machine transmits an image mail as illustrated in FIG. 11 to the receiving-end only with MH-coding capability. Note that, as illustrated in FIG. 11, the image data included in this image mail is as follows: a file format is TIFF, an encoding scheme is MMR, and a resolution is 200×200 dpi.

Further, assume that the digital multifunction device 11 receives a reception result mail as illustrated in FIG. 12 from the receiving-end machine. As illustrated in FIG. 12, the reception result mail includes a capability notification of the receiving-end machine (includes the Media-Accept-Features field). In this reception result mail, the occurrence of a reception error is described in Disposition field.

In response to this, the main control section 21 of the digital multifunction device 11 generates and retransmits an image mail as illustrated in FIG. 13 in which only the encoding scheme in the image format of the image data is altered to MH-encoding, so as to allow the receiving-end machine to print the image data.

Then, the digital multifunction device 11 receives from the receiving-end machine a reception result mail, as illustrated in FIG. 14, including the Disposition field indicating the completion of reception, and the transmission process is ended.

As described above, the digital multifunction device 11 is set such that in case where a reception error has occurred, the main control section 21 alters an image format of image data in an image mail (data to be retransmitted) to retransmit the image mail (data to be retransmitted) including this image data.

That is, the digital multifunction device 11 makes an attempt to avoid a reception error caused by the image format by altering the image format of the image data in the image mail for retransmission of the image mail.

With this arrangement, the digital multifunction device 11 can avoid the successive occurrence of errors even if the image mail is retransmitted. Therefore, as compared to the arrangements in which retransmission is not carried out at all or identical image mail is retransmitted, this arrangement can improve the efficiency of data transmission.

Further, when generating an image mail for retransmission, if a capability of the receiving-end machine is not suggested in the reception result mail, the main control section 21 causes the image data to have a basic format. Therefore, in this case, the reception error in the receiving-end machine can be securely prevented.

Further, if a processing capability of the receiving-end machine is suggested in the reception result mail, the main control section 21 causes the image data to have a format corresponding to the capability. Therefore, in this case, the reception error in the receiving-end machine can be securely prevented.

As compared to the alteration to the basic format, more suitable image mail can be transmitted (e.g. image mail can be transmitted more efficiently).

Moreover, in the case where the main control section 21 determines a communication error is a transmission error which is nothing to do with the capability of the receiving-end machine, the main control section 21 calls off the generation of an image mail for retransmission.

Some types of transmission errors are not caused due to image format but caused due to a trouble of the communication line and thus cannot be resolved for a short period of time. When such a transmission error caused by the trouble of the communication line occurs, an error is likely to occur at the time of retransmission, so that carrying out the retransmission is not worthwhile.

Therefore, in such a case, as with the digital multifunction device 11, the retransmission is not carried out when the transmitting error occurs, so that the time consumed by the retransmission process is saved and hence the transmission efficiency can be improved.

Note that, in the above description, in the format alteration process shown in FIG. 10, in the case where the capability of a receiving-end machine is not indicated in the reception result mail, the image format of the image data is altered to a basic format. However, the present system is not limited to this arrangement. It may be arranged such that in the case where the number of times the retransmission has been made is less than a secondarily set number of times to be retransmitted that has been determined by the user, the image mail is retransmitted without any alteration of the image format.

Figure 15:
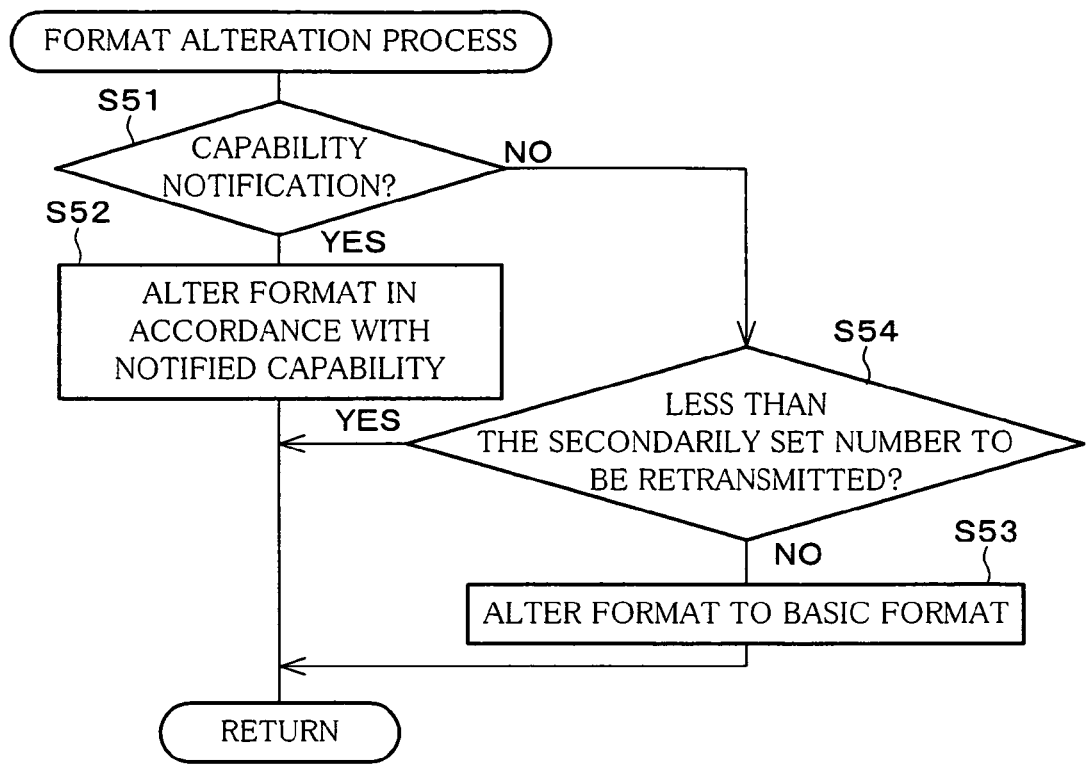
FIG. 15 is a flow chart, showing another process of format alteration, which is shown as S44 in FIG. 9.

FIG. 15 is a flowchart showing the flow of the format alteration process in this case. As illustrated in FIG. 15, this process is made by introducing S54 between S51 and S53 of the format alteration process shown in FIG. 10.

That is, in this process, in the case where the capability notification is not included in the reception result mail, the main control section 21 determines whether the number of actual retransmissions is less than the secondarily set number of times to be retransmitted (S54).

In the case where the number of actual retransmissions is less than the secondarily set number of times to be retransmitted, the main control section 21 completes the process without any alteration of the image data.

In this arrangement, retransmission is made with a first image format maintained until the number of times the retransmission has been made reaches the secondarily set number of times to be retransmitted. This allows the receiving-end machine to receive a more suitable image mail in the case where the lack of capability in the receiving-end machine is resolved during the retransmission.

Figure 16:
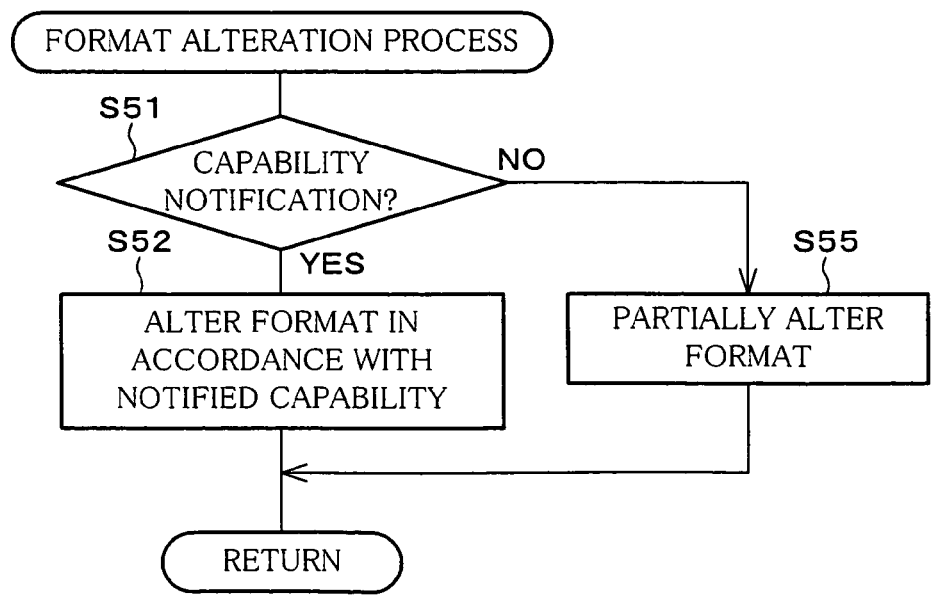
FIG. 16 is a flow chart, showing a further process of format alteration, which is shown as S44 in FIG. 9.

Further, the format alteration process may be a process as illustrated in FIG. 16.

As illustrated in FIG. 16, this process is made by introducing S55, instead of S53 of the format alteration process shown in FIG. 10.

That is, in this process, in the case where the capability notification is not included in the reception result mail, the main control section 21 partially alters an image format of the image data (S55). Note that, this alteration is made to facilitate the printing process.

As compared to the arrangement in which in the case where the capability notification is not included in the reception result mail, the image format of image data is immediately altered to a basic format, this arrangement makes it possible to transmit the image mail including image data with a condition as good as possible (image data with a high compression ratio and image data with a high resolution). This allows for improvement in transmission efficiency and image quality.

FIGS. 17 through 22 are explanatory views showing an example of the process shown in FIG. 16.

That is, assume that the digital multifunction device 11 as a transmitting-end machine transmits an image mail as illustrated in FIG. 17 to the receiving-end only with MH-coding capability. Note that, as illustrated in FIG. 17, the image data included in this image mail is as follows: a file format is TIFF, an encoding scheme is MMR, and a resolution is 200×200 dpi.

Further, assume that the digital multifunction device 11 receives a reception result mail as illustrated in FIG. 18 from the receiving-end machine. As illustrated in FIG. 18, the reception result mail does not include a capability notification of the receiving-end machine (not include the Media-Accept-Features field). In this reception result mail, the occurrence of a reception error is described in the Disposition field.

In response to this, the main control section 21 of the digital multifunction device 11 generates and retransmits an image mail as illustrated in FIG. 19 in which, for example, only the encoding scheme in the image format of the image data is altered to MR-encoding, so as to facilitate the printing of the image data in the receiving-end machine.

Still further, assume that the digital multifunction device 11 receives a reception result mail as illustrated in FIG. 20 from the receiving-end machine. As illustrated in FIG. 20, the reception result mail does not include a capability notification of the receiving-end machine (not include the Media-Accept-Features field). In this reception result mail, the occurrence of a reception error is described in the Disposition field.

In response to this, the main control section 21 of the digital multifunction device 11 generates and retransmits an image mail as illustrated in FIG. 21 in which, for example, only the encoding scheme in the image format of the image data is altered to MH-encoding, so as to further facilitate the printing of the image data in the receiving-end machine.

Then, in the case where the digital multifunction device 11 receives from the receiving-end machine a reception result mail, as illustrated in FIG. 22, indicating the completion of reception in the Disposition field, the transmission process is ended.

In the present embodiment, it is assumed that a short number list is stored in the address storage section 31. However, the present system is not limited to this arrangement. The short number list may be stored in the control memory 22.

Note that, the following will describe a registration process with respect to this short number list.

Figure 23:
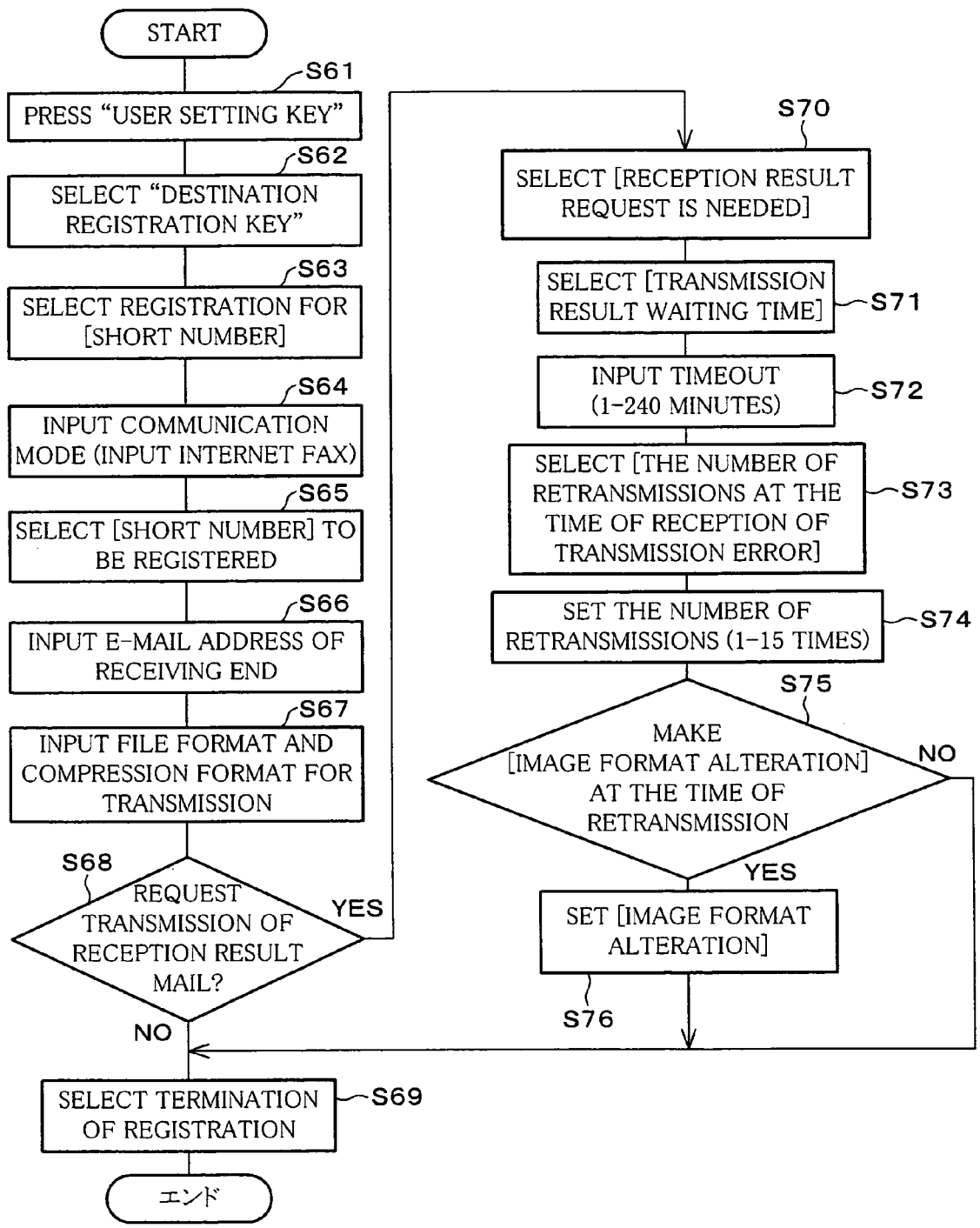
FIG. 23 is a flow chart, showing a registration process of the short number list in FIG. 8.

FIG. 23 is a flowchart showing the flow of this process.

As illustrated in FIG. 23, in the case where registration to the short number list is made, the user presses a user setting key 49 (S61). With this operation, the main control section 21 causes the digital multifunction device 11 to be in a short number list registration mode and causes the display section 41 to serve as a touch panel displaying keys described later.

Next, by the user, "destination registration key" displayed on the display section 41 is selected (S62), and a registration for "one touch key (short number)" is further selected (S63). Then, by the user, whether the communication mode is the facsimile transmission mode using an ordinary public telephone line or the INF communication mode is selected (S64).

Then, by the user, one touch key to be registered is assigned (S65). An e-mail address of a receiving-end machine, which is a destination, is inputted (S66), and a file format and compression format suitable for the receiving-end machine are inputted (S67).

Subsequently, the user determines whether to request a return of a reception result mail (S68). Then, in the case where the user does not request the return of a reception result mail, the user selects the end of the registration through the display section 41 (S69). In response to this, the main control section 21 terminates the process.

In the case where the user requests the return of a reception result mail, the user selects the button "reception result request is needed" through the display section 41 (S70).

Thereafter, by the user, "reception result waiting time", "timeout (time limit)", "the number of times to be retransmitted", and "whether image format alteration is carried out at the time of retransmission" are set (S71 through S76), and the process goes to S69.

Through the above steps (procedures), the registration to the short number list shown in FIG. 8 is completed.

According to the above arrangement, the main control section 21 of the digital multifunction device 11 as a transmitting-end machine does not retransmit an image mail when a transmission error occurs.

However, the present system is not limited to this arrangement. The main control section 21 may retransmit an image mail, even when a transmission error occurs, for example, after the lapse of a predetermined period of time. At this time, the main control section 21 may alter or not alter the image format of image data.

According to the above arrangement, the digital multifunction device 11 can transmit an image mail not only to a receiving-end machine that sends a reception result mail in response to the reception of the image mail, but also to a machine that cannot send such a reception result mail. In this case, the digital multifunction device 11 retransmits an image mail when a transmission error occurs.

That is, a data transmission device of the present invention may be alternatively in the following manner: A data transmission device for transmitting transmission data to a receiving-end machine, includes: a transmission data generation section which generates the transmission data to be transmitted to the receiving-end machine; and a transmission control section which controls and causes the transmission data generation section to generate the transmission data, and transmits the generated transmission data to the receiving-end machine, when a communication error occurs, the transmission control section generating retransmission data with a format different from a format of the transmission data, and retransmitting the retransmission data to the receiving-end machine.

According to the above arrangement, a file format and a compression format are given as an image format of image data.

However, an image format used in the present system (image format which is set so that it can be altered at the time of retransmission) is not limited to these formats. Any other image formats including, for example, a resolution and a size of image data, the number/type of displayed colors, and the number/type of fonts may be adopted. Further, the image format which is set so that it can be altered at the time of retransmission may be at least one of the image formats as described above.

According to the above arrangement, the digital multifunction device 11 and the server 12 are connected via the digital line DL. However, the present invention is not limited to this arrangement. The digital multifunction device 11 and the server 12 may be connected via an analog line (e.g. PSTN).

In this case, the digital multifunction device 11 makes a connection to the server 12 via the PSTN, using the modem 33 and the NCU 34.

The digital multifunction device 11 may directly access the Internet 13.

The above arrangement is given on the basis of transmission and reception of an image mail over the Internet (INF communication). However, a network for transmission and reception of an image mail in the present system, not limited to the Internet, may be other network (more local network).

According to the above arrangement, the INF communication is a method of transmitting and receiving an e-mail message including image data of a captured original document. However, the present system is not limited to this arrangement. The INF communication of the present system also allows for transmission and reception of communication data for FTP (File Transfer Protocol) and communication data for HTTP (Hypertext Transfer Protocol) each including image data.

According to the above arrangement, in S41 of the retransmission process shown in FIG. 9, the main control section 21 determines whether to perform retransmission, depending on whether the number of retransmissions is 0 or not. However, the main control section 21 may determine the necessity of retransmission in accordance with other information.

Further, the main control section 21 may be set so that the user can confirm the content of an altered image format prior to an actual retransmission. In this case, the main control section 21 performs retransmission after receiving an instruction for retransmission from the user.

According to the above arrangement, the display section 41 is made up of LCD. However, the display section 41 is not limited to this arrangement. The display section 41 may be made up of CRT (Cathode Ray Tube) display or EL (Electro Luminescence).

According to the above arrangement, the INF communication is controlled by the main control section 21. However, the digital multifunction device 11 is not limited to this arrangement, and another control section only for controlling the INF communication (MDN control section) may be provided.

According to the above arrangement, the digital multifunction device 15 has the same function as the digital multifunction device 11. However, the present system is not limited to this arrangement, and the digital multifunction device 15 may be any communication device such as facsimile device, provided that it can perform the INF communication using the MDN.

According to the above arrangement, the digital multifunction devices 11 and 15 are given as devices for transmitting and receiving an image mail in the INF communication. However, the present system is not limited to this arrangement, and a device performing the INF communication in the present system may be any device such as facsimile device, provided that it can perform the INF communication using the MDN.

The above description is assumed that the present system is related to the INF communication using the MDN. However, the present system is not limited to a system of the INF communication for transmission/reception and printing of an image mail.

That is, the present system is readily applicable to the transmission/reception of an image mail by other communication method.

For example, a device without printing function, such as image display device and digital camera, can be a receiving-end machine or a transmitting-end machine in the present system. In this case, in the case where this device receives such an image mail including image data that the device cannot receive (or cannot display), the device returns a reception result mail to a transmitting-end machine of the image mail. Then, the transmitting-end machine generates and retransmits an image mail including image data according to the capability indicated in the reception result mail (or more manageable image data).

Figure 24:
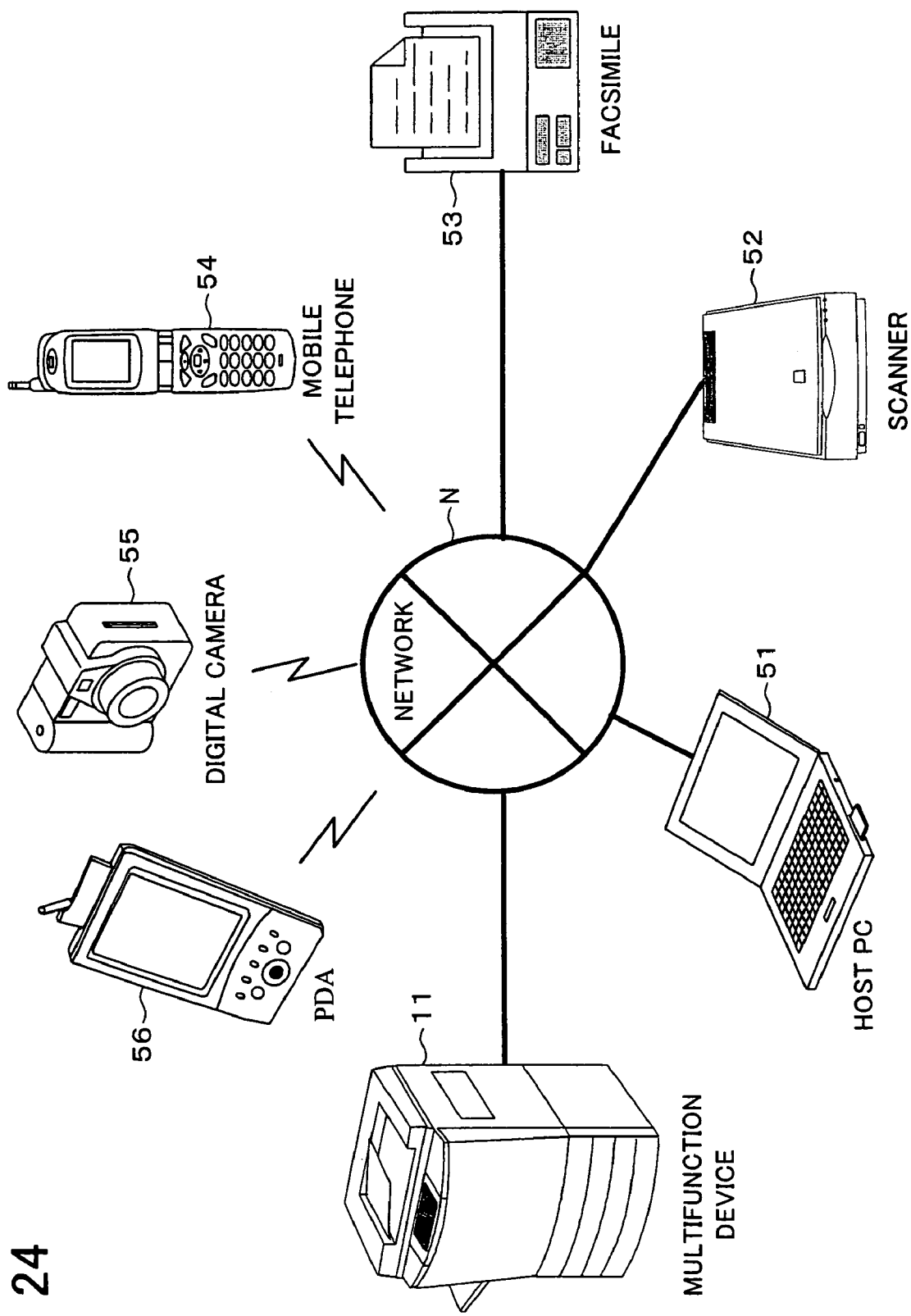
FIG. 24 illustrates another example of the communication system in accordance with an embodiment of the present invention.

Therefore, for example, the present system can be an arrangement as illustrated in FIG. 24. This system has an arrangement in which the digital multifunction device 11, a host personal computer (host PC) 51, a scanner 52, a facsimile 53, a mobile telephone (with digital camera) 54, a digital camera 55, and a PDA (personal digital assistant) 56 are connected to one another via a network N.

In this arrangement, the scanner 52 and the digital camera 55 are dedicated devices for transmission, and the other devices are devices performing both transmission and reception of an image mail.

In this arrangement, for example, an image mail including image taken by a device with digital camera function (digital camera 55, mobile telephone 54, etc.) can be transmitted to the PDA 56.

For example, in the case where the PDA 56 can display only images of PNG format, but image data in an image mail is in JPEG format, the PDA 56 transmits a reception result mail including a capability notification to a receiving-end machine.

Next, the receiving-end machine which has received the reception result mail alters the image format of the image data to PNG format when the machine is compatible to the capability of the PDA 56, and thereafter retransmits the image mail to the PDA 56.

Note that, when the PDA 56 is endowed with digital camera function, it is possible to transmit an image mail including a photographed image from the PDA 56 to other devices.

Also, it is possible to transmit to the facsimile 53 an image mail including image data captured by a device endowed with scanner function (digital multifunction device 11, scanner 52, etc.).

For example, in the case where the facsimile 53 can print only a TIFF-format image, but image data in an image mail is in PDF format, the facsimile 53 transmits a reception result mail including a capability notification to a receiving-end machine.

Next, the receiving-end machine which has received the reception result mail alters the image format of the image data to TIFF format when the machine is compatible to the capability of the facsimile 53, and thereafter retransmits the image mail to the facsimile 53.

When an image mail is transmitted from the scanner 52 and the host PC 51 to the mobile telephone 54 (or the PDA 56), it is conceivable that the mobile telephone 54 cannot display its image data due to limitations on image format, image size (resolution), and the number of colors, or the mobile telephone 54 cannot receive the image data due to limitation on file size for received image data.

In this case, the mobile telephone 54 transmits a reception result mail including a capability notification to a receiving-end machine. Then, the receiving-end machine that has received the reception result mail alters the image format of image data in accordance with the capability of the mobile telephone 54 and retransmits the image mail to the mobile telephone 54.

According to the above arrangement, when a transmission error (communication error on the network (connection error)) occurs, the occurrence of the transmission error is notified to the user of the digital multifunction device 11 as a receiving-end machine, and the transmission process is ended.

However, the present system is not limited to this arrangement. A setting for retransmission or for termination (cancellation) of the transmission process at the time of the occurrence of a transmission error occurs may be made in advance.

In this case, when a transmission error occurs under the setting for retransmission, an image mail is retransmitted without any alteration of an image format of image data. When a reception error occurs due to the lack of capability in a receiving-end machine, as in the above case, an image mail is retransmitted with alteration of an image format of image data.

According to the above arrangement, in S34 of FIG. 9, the main control section 21 determines whether alteration of an image format (format alteration) is needed at the time of retransmission. However, with this step omitted, the format alteration process may be always performed in the case where the number of actual retransmissions is less than the set number of times to be retransmitted.

According to the above arrangement, the main control section 21 alters an image format of image data in an image mail at the time of retransmission.

However, the present invention is not limited to this arrangement. In the present system, in generating an image mail for retransmission, any one of elements for the image mail (e.g. the format of an e-mail message) may be altered.

Second Embodiment

The following will describe Second Embodiment of the present invention. By the way, members having the same functions as those described in First Embodiment are given the same numbers, so that the descriptions are omitted for the sake of convenience.

First Embodiment have chiefly described the transmission of an image mail in the digital multifunction device 11.

In the present embodiment, on the other hand, the receiving of an image mail in the digital multifunction device 11 in an efficient manner will be described.

As shown in First Embodiment, the present system is arranged such that, when an image mail being transmitted is not processable, to inform this, a reception result mail is supplied to a transmitting-end machine. Receiving the reception result mail, the transmitting-end machine alters the image format of the image mail in accordance with the instruction of the reception result mail, and retransmits the altered image mail.

In this manner, in the present system, a plurality of image mails and reception result mails are transmitted and received between devices.

Hereinafter, to clearly distinguish between these mails, an image mail which is initially received (regardless of the reception result) is termed initial image mail (initial transmission data), and an image mail which is resent in accordance with a reception result mail supplied on the occasion of reception error (i.e. re-receiving data) is termed retransmission image mail.

In the present embodiment, when the digital multifunction device 11 carries out the transmission and reception of data in accordance with INF communication or typical facsimile communication, a main control section 21 posts the information regarding the communication to a communication management table.

FIG. 29(a) illustrates an example of this communication management table.

As in the figure, the communication management table includes the following items: "REFERENCE NUMBER (Ref. No.)", "TRANSMISSION AND RECEPTION", "COMMUNICATION DATE", "TIME", "COMMUNICA- TION MODE", "PARTY ON THE OTHER END", "VOLUME OF COMMUNICATION", and "COMMUNICATION RESULT".

"REFERENCE NUMBER" denotes a serial number assigned to each communication (transmission and reception). "TRANSMISSION AND RECEPTION" denotes the type of communication process (i.e. transmission process or reception process). "COMMUNICATION DATE" and "TIME" denote the date and time of carrying out each communication process.

"COMMUNICATION MODE" denotes the type of a communication mode (i.e. INF communication (mail) or facsimile (FAX)).

"PARTY ON THE OTHER END" denotes the mail address or FAX number of a party on the other end of communication. "VOLUME OF COMMUNICATION" denotes either the number of predetermined sheets on which the data having been transmitted is printed, or the number of pages being transmitted or received.

"COMMUNICATION RESULT" is either "OK" when the communication is completed (succeeded) or "NG" when the communication is failed.

Note that, the communication is judged as failure when a transmission error, reception error, or timeout error is notified on the occasion of transmitting an image mail by the INF communication (see FIG. 1; when the errors above are not notified, the communication is judged as successful).

The communication is also judged as failure when image data cannot be printed (or displayed) due to reasons such as the lack of communication capability (e.g. decoding capability) on the occasion of receiving an image mail by the INF communication.

The communication management table is stored in a control memory 22 (or an address storage section 31) of the digital multifunction device 11, and posting to the communication management table (i.e. management of the communication management table) is performed by the main control section 21.

Now, the following will describe a reception process of the present embodiment, which is a process of receiving an image mail performed by the digital multifunction device 11.

Figure 28:
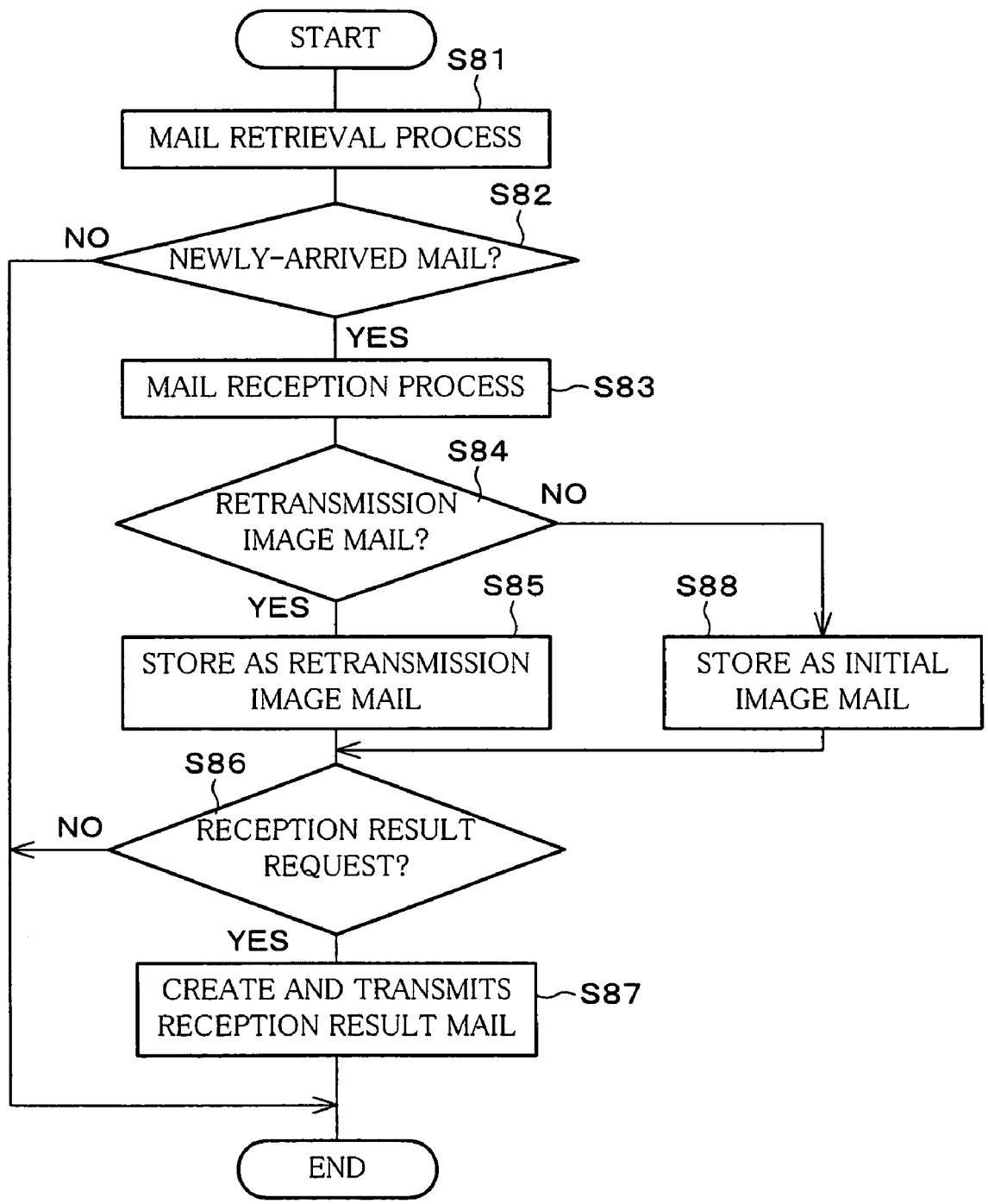
FIG. 28 is a flow chart, showing the process of receiving an image mail in the digital multifunction device in FIG. 3

FIG. 28 is a flow chart showing the steps of this process.

As the figure shows, in the reception process, the main control section 21 periodically connects the digital multifunction device 11 with a server 12, using a digital line connection section 35. Then, if the server 12 stores an image mail (newly-arrived mail) destined for the digital multifunction device 11, the main control section 21 receives the image mail (S81) and terminates the connection.

If no newly-arrived mail is stored, the main control section 21 terminates the process.

If there is a newly-arrived mail being stored, the main control section 21 prints (or displays) image data in the image mail (S83; Mail Receiving Step).

Subsequently, the main control section 21 determines whether or not the received image mail is a retransmission image mail (S84; the method of determination will be described later).

If it is determined that the received image mail is not a retransmission image mail, the main control section 21 stores this image mail in the communication management table, as an initial image mail (S88). More specifically, the main control section 21 posts the information regarding the reception result (print result) of the image mail to corresponding items of the communication management table.

Meanwhile, if it is determined that the received image mail is a retransmission image mail, the main control section 21 stores this image mail in the communication management table, as a retransmission image mail (S85).

FIG. 29(b) illustrates an example of the communication management table storing information regarding the receiving of the retransmission image mail. In the figure, the information (retransmission information) regarding a newly-received retransmission image mail is posted in an item of Ref. No. 005.

As illustrated in the figure, upon reception of the retransmission image mail, the main control section 21 adds a new item "RETRANSMISSION (Ref. No.)" to the end (rightmost) of the communication management table. This item is provided for indicating the reference number (001 in the example) of the initial image mail, which corresponds to the retransmission image mail.

Next, the main control section 21 judges whether or not a reception result request is attached to the image mail (S86). If no reception result request is attached, the process is terminated.

If it is judged that the reception result request is attached to the image mail, the main control section 21 generates a reception result mail corresponding to the reception result of the image mail.

Subsequently, the main control section 21 connects the digital multifunction device 11 with the server 11, using the digital line connection section 35, and then transmits the reception result mail to the transmitting-end machine (S88). After that, the main control section 21 disconnects the digital multifunction device 11 from the server 12, and terminates the process.

The following is a more specific description of the transmission and reception of the image mail and reception result mail of the present embodiment.

FIG. 25 shows an example of the initial image mail.

As in the figure, the initial image mail of the present embodiment is, as in the case of the image mail of FIG. 5 discussed in First Embodiment, made of a header (a), a main text (b), and an attachment file (c). Note that, the initial image mail in this example is divided into the sections (a)-(c) for purpose of illustration, even if, in reality, an image mail is not divided as such. In the initial image mail in FIG. 25, the main body (b) indicates that the encoding scheme of the attached image data (attachment file) is MMR.

In the header of this initial image mail, a Disposition-Notification-Options field is included.

This field relates to a mail identification ID for distinguishing a group of mails including the above-mentioned initial image mail and mails related to the initial image mail from other mails, and the main control section 21 sets up the field.

According to the example of FIG. 25, a Message-Id which is an identification ID of the initial image mail is indicated in this field. Thus, in the retransmission image mail regarding the initial image mail of the present embodiment, the Disposition-Notification-Options field always has the message-Id of the initial image mail.

Also in the reception result mail regarding the initial image mail of the present embodiment, the Message-Id of the initial image mail is always indicated to a predetermined section, as described below.

FIG. 26 illustrates an example of the reception result mail being transmitted, in accordance with the present embodiment. Note that, this reception result mail in FIG. 26 is a reception result mail transmitted from a receiving-end machine, when the image mail (image mail illustrated in FIG. 25) including the image data which is MMR-coded is transmitted to a receiving-end machine which only has MH-coding (decoding) capability.

As in the figure, this reception result mail is, as in the example in FIG. 6, made of a header (a), a main text (b), and MDN information (c). Note that, the reception result mail in this example is divided into the sections (a)-(c) for purpose of illustration, even if, in reality, a reception result mail is not divided as such.

In the example, the destination of the reception result mail is an address designated in a Disposition-Notification-To field of the initial image mail (see FIG. 25(*a*)). Since the image data cannot be decoded, it is indicated in a Subject field of the reception result mail that the process is failed.

Also in a Disposition field (a field for indicating whether or not the process of an image mail is succeeded) of the reception result mail, the failure of the process is indicated.

As FIG. 26(*c*) shows, in the present reception result mail, a content-X-From-Request field is included in the MDN information.

This field corresponds to the Disposition-Notification-Options field of the initial image mail, and to this content-X-From-Request field, a mail identification ID (in this case, Message-Id <111@SHARP_D1> of the initial image mail) is posted by the main control section 21 of the receiving-end machine.

As described in First Embodiment, a Media-Accept-Features field of the reception result mail is a field for indicating the processing capability (receiving and printing capabilities) of the receiving-end machine.

In the example in FIG. 26(*c*), the receiving-end machine is set as follows: monochrome images are displayed (printed) (color=Binary); only TIFF-format images are read (image-file-structure=Tiff-limited); images are displayed in resolution of 200 dpi (dpi=200); images with an aspect ratio of 200:100 or 200:200 are displayed (dpi-xyratio=[200/100, 200/200]; MH-coding is carried out (image-coding=[MH]); an MRC (Mixed Raster Content) mode is set at 0 (MRC-mode=0); and A4, B4, or A3-sized sheets are used (paper-size=[A4,B4,A3]).

In the transmitting-end machine (digital multifunction device 11) received the above-described reception result mail, as in First Embodiment, the main control section 201 alters the image format of the image data, in accordance with the capability of the transmitting-end machine designated by the reception result mail, and outputs a retransmission image mail (in this case, the main control section 21 alters the encoding scheme of the image data to MH).

FIG. 27 illustrates this retransmission image mail. As in the figure, the retransmission image mail is identical with the image mail in FIG. 25, except the following points.

That is, as in FIG. 27(*a*), in the retransmission image mail, the transmission date and time shown in a Date field of a header is later than the transmission data and time of the image mail in FIG. 25.

Also, the retransmission image mail is further provided with a header, a In-Reply-To field, and a References field.

The In-Reply-To field is provided for designating <AAA@SHARP_D1> indicated in the Message-Id field of the reception result mail in FIG. 26(*a*) and indicating that the retransmission image mail is a reply to the reception result mail.

The References field indicates an ID of an e-mail message to which the main control section 21 refers in order to generate the above-mentioned retransmission image mail. In the present example, since the reply to the reception result mail in FIG. 26 has been carried out, the References field has <AAA@SHARP_D1> which has been indicated in the Message-Id field in FIG. 26(*a*).

In the header of the retransmission image mail, a mail identification ID (in this case, a Message-Id <111@SHARP_D1> of the initial image mail) is posted to the Disposition-Notification-Options field by the main control section 21.

That is to say, in this Disposition-Notification-Options field, it is indicated that the retransmission image mail relates to the initial image mail (mail in FIG. 25) having the Message-Id of <111@SHARP_D1>.

In FIG. 27(*a*), <222@SHARP_D1> is newly designated to the Message-Id field.

Further, FIG. 27(*b*) illustrates that, unlike FIG. 25, the encoding scheme of the attachment file in FIG. 27(*c*) is MH. This is because, as described above, the encoding scheme of the image data is altered in accordance with the capability of the receiving-end machine.

Note that, in S84 in FIG. 28, the main control section 21 determines whether or not a newly-arrived mail is a retransmission image mail. This determination is carried out by comparing the Message-Id fields of all image mails having already been received and the Disposition-Notification-Options field of the newly-arrived mail.

That is to say, when an initial image mail having a Message-Id field identical with the Disposition-Notification-Options field of a newly-arrived mail has already been received, the main control section 21 determines that the newly-arrived mail is a retransmission image mail.

FIG. 30 shows an example of a reception result mail (second time) which is transmitted in accordance with the retransmission image mail in FIG. 27, from the receiving-end machine.

As in FIG. 30(*a*), this reception result mail has a date and time in a Date field of a header, which is later than the date and time of the reception result mail in FIG. 26.

A Subject field has a description indicating the success of the process.

Further, as in FIG. 30(*c*), the reception result mail has an Original-Message-Id identical with the Message-Id of the retransmission image mail shown in FIG. 27(*a*).

As also in FIG. 30(*c*), the reception result mail has a content-X-From-Request field in which Message-Id <111@SHARP_D1> of the initial image mail, which is a mail identification ID, is indicated.

As described above, the digital multifunction device 11 of the present embodiment is arranged such that it is judged whether or not a newly-arrived mail is a retransmission image mail, and the result of the judgment is recorded in the communication management table. With this arrangement, it is possible to carry out the communication management in a systematic manner. For instance, the arrangement makes it possible to easily judge whether a retransmission image mail regarding an initial image mail which has previously been failed to be processed is received or not.

After confirming the reception of the retransmission image mail, the receiving-end machine can, for instance, delete an initial image mail corresponding to the retransmission image mail and related information from a mail storing section and communication management table.

In the present embodiment, the transmitting-end machine indicates a single mail identification ID to a plurality of retransmission image mails regarding a single initial image mail. With this arrangement, the receiving-end machine can easily judge whether or not a newly-arrived mail is a retransmission image mail.

In the conventional art, the result of communication management is as shown in FIG. 31. That is to say, as in FIG. 31(*a*), upon the reception of an image mail, the information regarding the same is stored in a communication management table. However, as in FIG. 31(b), when a retransmission image mail corresponding to an initial image mail having a Ref No. "001" is received ("005"), it is not possible to recognize the reception of this mail. For this reason, the receiving-end machine cannot perform the communication management in a systematic manner.

The present embodiment may be alternatively arranged such that, when it is judged in S84 in FIG. 28 that a newly-arrived mail is a retransmission image mail, the main control section 21 generates a communication management report shown in FIG. 32, and displays the report on a display section 41 of an operation panel 32.

This communication management report shows items of the communication management table, regarding the received retransmission image mail and an initial image mail concerning the received retransmission image mail.

Further, in the present embodiment, the initial image mail transmitted from the transmitting-end machine may be arranged as in FIG. 33.

This initial image mail is identical with the initial image mail in FIG. 25, except that the Disposition-Notification-Options field is designated as In-reply-To-Request.

As described above, in the initial image mail in FIG. 25, the Disposition-Notification-Options field is designated as Message-Id-Request. This is an instruction to record the Massage-Id of the initial image mail in the content-X-From-Request field of the reception result mail, as a mail identification ID.

In the meantime, as FIG. 33(a) illustrates, designating the Disposition-Notification-Options field as In-Reply-To-Request is an instruction to record In-Reply-To in the content-X-From-Request field of the reception result mail (notification that the initial image mail is in compliance with the request of the MDN replying condition).

FIG. 34 shows an example of a reception result mail corresponding to the initial image mail in FIG. 33. In this reception result mail, a content-X-From-Request field is designated as In-Reply-To (request of In-Reply-To).

FIG. 35 illustrates an example of a retransmission image mail corresponding to the reception result mail in FIG. 34. In this retransmission image mail, an In-Reply-To field of a header is designated as <AAA@SHARP_D1> which is a Message-Id of the reception result mail in FIG. 34.

In this manner, when In-Reply-To is indicated in the content-X-From-Request field of the reception result mail, the Message-Id of the reception result mail is posted to the In-Reply-To field of the retransmission image mail.

In this arrangement of transmitting and receiving mails, when it is judged whether or not a newly-arrived mail is a retransmission image mail in S84 in FIG. 28, first, the main control section 21 of the receiving-end machine judges: (i) whether or not a reception result mail having a Message-Id identical with the description in a In-Reply-To field of the newly-arrived mail has been transmitted, and (ii) whether or not a mail having a Message-Id identical with the description in a In-Reply-To field of the newly-arrived mail has been received. When such a reception result mail has been transmitted, an initial image mail corresponding to this reception result mail is specified using, for instance, the Message-Id of the initial image mail.

With this arrangement, the main control section 21 can judge whether or not a newly-arrived mail is a retransmission image mail, and can identify an initial image mail corresponding to the retransmission image mail.

Note that, the content of the In-Reply-To field of the retransmission image mail shown in FIG. 27(a) is also identical with the content of the retransmission image mail shown in FIG. 35. However, concerning the mails shown in FIGS. 25-27, mail identification using a Disposition-Notification-Options field is carried out. For this reason, the In-Reply-TO field is only secondarily used.

Further, in the present embodiment, upon the reception of the retransmission image mail, the main control section 21 of the receiving-end machine posts the information regarding this mail to a newly-generated item of the communication management table.

However, apart from this arrangement, the main control section 21 may be arranged such that the communication result of the retransmission image mail is overwritten to the communication result of the initial image mail corresponding to the retransmission image mail (i.e. the communication result may be updated).

Further, the information in all items of the retransmission image mail may be overwritten to the corresponding items of the initial image mail.

When the initial image mail in FIG. 33 is received but the processing thereof is failed, the receiving-end machine may output a reception result mail shown in FIG. 36.

In this reception result mail, a content-X-From-Request field shown in FIG. 36(c) is designated as In-Reply-To. Further, as shown in FIG. 37(a), an In-Reply-To field is provided and a Message-Id of the initial image mail is posted thereto.

FIG. 37 shows an example of a retransmission image mail corresponding to the reception result mail in FIG. 36. In this retransmission image mail, <AAA@SHARP_D1> which is the Message-Id of the reception result mail in FIG. 34 and <111@SHARP_D1> which is the Message-Id of the initial image mail are indicated in the In-Reply-To field in a header.

Thus, in this arrangement, upon the reception of a newly-arrived mail, the receiving-end machine compares an In-Reply-To field of the newly-arrived mail with the content of the communication management table of the receiving-end machine. Thanks to this comparison, the receiving-end machine can easily recognize whether or not the newly-arrived mail is a retransmission image mail, and if so, the receiving-end machine can easily identify the initial image mail of the retransmission image mail.

Also in the above-mentioned arrangement, upon the reception of a retransmission image mail, the main control section 21 of the receiving-end machine posts a Ref. No. of an initial image mail of this retransmission image mail to the item "RETRANSMISSION (Ref. No.)", regarding the received retransmission image mail, in the communication management table.

In addition to this, it is preferable that the main control section 21 of the receiving-end machine posts the Ref. No. of the initial image mail of this retransmission image mail to the item "RETRANSMISSION (Ref. No.)" regarding a reception result mail to be transmitted.

In the arrangement above, the transmitting-end machine indicates a single mail identification ID to all retransmission image mails regarding a single initial image mail. However, it is more preferable that, also to a reception result mail transmitted from the receiving-end machine, the mail identification ID regarding an initial image mail corresponding to the reception result mail is indicated. With this arrangement, the mail management in the transmitting-end machine is further facilitated.

The transmission and reception of data between the digital multifunction devices 11 (or between digital multifunction devices 15) has been described above. However, even when the digital multifunction device 11 receives an image mail from a typical transmitting-end machine which does not carry out the retransmission process in FIG. 9 (e.g. a transmitting-end machine which transmits (retransmits) data following the instruction from the user), the above-described mail management using the communication management table can be carried out.

The data transmission method of the present invention may be alternatively described in the following manner: A data transmission method, by which a reception result of transmission data is confirmed on ground of a reception result notification from a receiving-end machine, includes the steps of: generating a transmission data to be transmitted to the receiving-end machine, using a transmission data generating section of a data transmission device; transmitting the transmission data to the receiving-end machine, using a management section of the data transmission device; when a communication error occurs, generating a retransmission data in which the format of the transmission data is altered, using the management section, and transmitting the retransmission data to the receiving-end machine.

Also, the data transmission method of the present invention may be alternatively described in the following manner: A data receiving method, by which a transmission data is received and a reception result notification in accordance with a reception result is returned, carries out the steps of: storing information of transmission data having already been received, using a storing section and management section of a data reception device; and in accordance with the stored information, judging that a newly-received transmission data is either retransmission data of the already-received transmission data or initial transmission data being different from the retransmission data.

Further, the data transmission method of the present invention may be alternatively described in the following manner: A data receiving method, by which a transmission data is received and a reception result notification in accordance with a reception result is returned, includes the steps of: storing information of transmission data having already been received, using a storing section and management section of a data reception device; and in accordance with the stored information, judging that a newly-received transmission data is either retransmission data of the already-received transmission data or initial transmission data being different from the retransmission data.

According to the descriptions above, all processes carried out by the transmitting-end machines and receiving-end machines of the present system are under the management of the main control section 21. However, the present system is not limited to this arrangement, and hence there is an alternative arrangement such that a program for carrying out the above-mentioned processes is recorded in a recording medium, and an information processing device which can read out the program is used in place of the main control section 21.

In this arrangement, an arithmetic unit (such as a CPU and MPU) of the information processing device reads out the program recorded in the recording medium, and execute the processes. Thus, it is possible to consider that the processes are realized by the program itself.

As the above-mentioned information processing device, feature expansion boards and units attached to a computer can be adopted, apart from typical computers (such as work stations and personal computers).

The above-mentioned program is a program code of a software realizing the processes (e.g. an execute form program, intermediate code program, source program). The program may be self-contained, or used in combination with another program (e.g. an operating system). After being read out from the recording medium, the program may be stored temporarily in a memory (such as a RAM) in the device, and then read out again and executed.

The recording medium in which the program is recorded may be easily detachable from the information processing device, or may be fixed (attached) to the device. Alternatively, the recording medium may be an external memory unit connected to the device.

As such a recording medium, the followings may be adopted: magnetic tapes such as a vide tape and cassette tape, magnetic disks such as a Floppy® disk and hard disk, optical disks such as a CD-ROM, MO, MD, DVD, and CD-R, memory cards such as an IC card and optical card, and semiconductor memories such as a mask ROM, EPROM, EEPROM, and flash ROM.

Also, a recording medium connected to the information processing device via a network (e.g. intranet and the Internet) may be adopted. In this case, the information processing device downloads the program via the network. That is to say, the program may be obtained through a transmission medium (a medium fluidly carrying the program) on a network (connected to a wired/wireless line). Note that, a program for downloading is preferably stored in the information processing device (or in the transmitting-end machine or receiving-end machine) in advance.

As described above, the data transmission device (present transmission device) of the present invention, in which a reception result of transmission data is confirmed on ground of a reception result notification transmitted from a receiving-end machine, is characterized by comprising: a transmission data generation section which generates the transmission data to be transmitted to the receiving-end machine; and a transmission control section which controls and causes the transmission data generation section to generate the transmission data, and transmits the generated transmission data to the receiving-end machine, when a communication error occurs, the transmission control section causing the transmission data generation section to generate retransmission data with a format different from a format of the transmission data, and retransmitting the retransmission data to the receiving-end machine.

The present transmission device is connected to other communication devices via communication lines such as a LAN (Local Area Network), the Internet, and a public switched telephone network (PSTN).

Then in this transmission device, the transmission control section controls and causes the transmission data generation section to generate transmission data to be transmitted to another communication device, so that the transmission step is carried out.

After transmitting the transmission data, the present transmission device receives a reception result notification, which includes a reception result/progress, from a receiving-end machine with which the present transmission device communicates.

Thus, the present transmission device can determine whether or not the receiving-end machine can properly transmit transmission data, on ground of the reception result notification.

In the present transmission device, in particular, when a communication error occurs, the transmission control section causes the transmission data generation section to generate retransmission data having a format different from a format of the transmission data, and retransmit the retransmission data to the receiving-end machine.

Note that, the communication error includes a transmission error and reception error.

The transmission error indicates that the transmission data cannot be transmitted to the receiving-end machine due to a poor line connection or other reasons.

Meanwhile, the reception error indicates that the receiving-end machine cannot properly receive the retransmission data. The occurrence of this reception error can be easily identified by checking the content of the reception result notification.

Further, the format of the transmission data is, for instance, a data format of transmission data, such as a file format and a resolution, encoding scheme, and size of data.

In other words, the present transmission device attempts to avoid the occurrence of the communication error due to the data format, by altering the data format of the transmission data and retransmitting the same.

With this arrangement, the present transmission device can avoid successive occurrence of the communication errors, when the transmission data is retransmitted. Thus, compared to the arrangements in which retransmission is not carried out at all or identical transmission data is retransmitted, the present arrangement can improve the efficiency of data transmission.

Further, a communication system including the present transmission device can carry out efficient data transmission.

Further, in the present transmission device, the transmission data may include image data. In this case, furthermore, the transmission control section may cause the transmission data generation section to alter the format of the image data in the transmission data and generate retransmission data.

The disagreement of the formats of image data often causes the reception error. For this reason, suitably altering the format increases the possibility of successfully receiving transmission data including image data.

When retransmission data is generated, the transmission control section preferably alters the format of the retransmission data to be an easy-to-process format (e.g. altering a part of the format to be a most accepted format (described later)). With this arrangement, it is possible to certainly increase the possibility of receiving by the receiving-end device.

Note that, the most accepted format is a format which can be processed by a communication device having minimum required capabilities or having normal capabilities (i.e. the most accepted format is the most simple format). With this arrangement, it is possible to certainly prevent the occurrence of the reception error in the receiving-end machine.

Further, when the retransmission data is generated, if a capability of the receiving-end machine is suggested in the reception result notification, the transmission control section preferably causes controls and causes the transmission data generation section to alter the format of the retransmission data to be a most accepted format.

Also with this arrangement, it is possible to certainly prevent the occurrence of the reception error in the receiving-end machine.

Further, compared to the alteration to the most accepted format, more suitable transmission data can be transmitted (e.g. transmission data can be transmitted more efficiently).

The present transmission device preferably includes an operating section which displays information for a user and receives instructions from the user.

Further, in this arrangement, the transmission control section preferably controls the operating section so as to display a format (all of the format or only an altered part of the format) of the retransmission data for the user, before the transmission of the retransmission data. Then after the retransmission instruction from the user, the transmission control section preferably retransmit the retransmission data.

With this arrangement, since the user can confirm the detail of alteration, it is possible to avoid the retransmission under a format that the user does not wish. Further, in this arrangement, if the transmission data has a format that the user does not wish, the transmission control section preferably re-alters the format in accordance with the user instruction.

When the communication error is determined as a transmission error which is nothing to do with a capability of the receiving-end machine, the transmission control section preferably calls off generation of the retransmission data.

Some types of the transmission error are not caused due to a format of the transmission data but caused by a trouble of the communication line and thus cannot be resolved for a short period of time. When such a transmission error caused by the trouble of the communication line occurs, an error is likely to occur at the time of retransmission, so that carrying out the retransmission is not worthwhile.

Thus, in such a case, as described above, the retransmission is not carried out when the transmission error occurs, so that the time consumed by the retransmission process is saved and hence the transmission efficiency can be improved.

Note that, examples of the data communication method (transmission method) of the present transmission device include e-mail and FTP.

That is to say, the transmission control section may control and cause the transmission data generation section to generate transmission data made up of e-mail data (or FTP data).

The data transmission method (present transmission method) of the present invention, by which a reception result of transmission data is confirmed on ground of a reception result notification transmitted from a receiving-end machine, is characterized by comprising the steps of: (a) generating transmission data to be transmitted to the receiving-end machine; (b) transmitting the transmission data to the receiving-end machine; and (c) when a communication error occurs, generating retransmission data with a format different from a format of the transmission data, and retransmitting the retransmission data to the receiving-end machine.

The present transmission method is a data transmission method used in the above-described transmission device. That is to say, in the present transmission method, the occurrence of a communication error due to a data format is avoided by altering a data format of transmission data and carrying out retransmission.

With this arrangement, successive occurrence of the communication errors can be avoided, even if the transmission data is retransmitted.

Thus, compared to the arrangements in which retransmission is not carried out at all or identical transmission data is retransmitted, the present arrangement can improve the efficiency of data transmission.

A data transmission program of the present invention is characterized by causing a computer of an information communication device to function as the transmission data generation section and transmission control section of the present transmission device.

In other words, the data transmission program of the present invention is characterized by causing a computer of an information communication device to execute the above-mentioned steps (a), (b), and (c) of the present transmission method.

By causing the computer of the information communication device to read these programs, the process of the present transmission device (present transmission method) can be implemented using the computer.

Recording these programs in a computer-readable recording medium makes it possible to distribute and store the programs with ease. Furthermore, by reading out the programs from the recording medium, the information communication device including the computer can carry out data transmission in accordance with the present transmission device (present transmission method).

The data reception device (present reception device) of the present invention, which receives the transmission data transmitted from the data transmission device of the present invention and returns a reception result notification corresponding to the reception result, is characterized by comprising: a storing section which stores information of transmission data having already been received; and a reception control section which determines whether newly-received transmission data is retransmission data of the transmission data having already been received or initial transmission data being different from the retransmission data, on ground of the information stored in the storing section.

In the present reception device, the information of the transmission data having already been received is stored in the storing section. Note that, the information of transmission data is, for instance, information peculiar to each set of transmission data, such as transmission data itself, an ID indicating transmission data, data and time of transmission, transmitting party, reception result, and identifier (e.g. Ref. No.) attached to each set of transmission data.

Further, as described above, the present transmission device retransmits transmission data, when a communication error occurs.

Then, in the present reception device, the transmission control section compares the information of newly-arrived transmission data (newly-arrived data) with the information of transmission data having been stored in the storing section, and determines whether the newly-arrived data is retransmission data of the transmission data having already been received or initial transmission data.

Note that, the initial transmission data is transmission data which is received by the present reception device for the first time (on this occasion, the reception result is not taken into consideration; i.e. the initial transmission data is transmission data not corresponding to the transmission data which have already been received).

With this arrangement, the present reception device can manage the related sets of transmission data, in a systematic manner. For instance, the present reception device can easily determine whether or not the retransmission data concerning the initial transmission data having been failed to process is received (the user can easily make this determination, too).

Further, for instance, after the confirmation of the reception of the retransmission data, it is possible to take measures such as the deletion of the initial transmission data concerning the retransmission data and related information of this initial transmission data, from the storing section.

Moreover, a communication system including the above-mentioned present reception device and present transmission device can efficiently carry out data transmission.

The reception control section preferably causes the storing section to store a communication management table which stores (i) an identifier (e.g. Ref. No.) of the transmission data having already been received and (ii) related information of the transmission data having already been received, in association with each other. Generating such a table, the condition of receiving the transmission data can be easily notified to the user.

Further, when the newly-received transmission data is determined as the retransmission data, the reception control section preferably controls and causes the storage section to store in the communication management table an identifier of initial transmission data regarding the retransmission data, as related information of the retransmission data. With this arrangement, the user can easily recognize the reception of the retransmission data concerning the initial transmission data that has previously been failed to be processed.

Further, when the newly-received transmission data is determined as the retransmission data, the reception control section may update related information (information on the communication management table) of initial transmission data regarding the retransmission data, in accordance with a reception result of the retransmission data.

A transmission control section of the present transmission device preferably causes the initial transmission data and retransmission data regarding this initial transmission data to share a single first ID (to include a single first ID). The first ID is, for instance, a Message-Id of transmission data.

In this case, on ground of this first ID, the reception control section preferably determines whether the newly-received transmission data is retransmission data or initial transmission data. This arrangement allows the reception control section to easily identify the type of the transmission data.

Further, in this case, the reception control section preferably causes the first ID attached to the transmission data to be included in the reception result notification.

Thus, in the present transmission device, it is possible to easily identify the type of the transmission data, with reference to the received reception result notification.

Further, in addition to the first ID, the transmission control section of the present transmission device may cause a second ID in the transmitted reception result notification to be included in retransmission data regarding this transmitted reception result notification. The second ID is, for instance, a Message-Id of a reception result notification.

In this case, on ground of the first or second ID, the reception control section preferably determines whether newly-received transmission data is retransmission data or initial transmission data. Also this arrangement makes it possible to easily identify the type of the transmission data in the reception control section.

A transmission control section of the present transmission device may cause a second ID in transmitted reception result notification to be included in retransmission data regarding this transmitted reception result notification.

In this case, on ground of this second ID, the reception control section determines whether newly-received transmission data is retransmission data or initial transmission data. Also this arrangement allows the reception control section to easily identify the type of the transmission data.

The present reception device can carry out data transmission/reception with a transmission device in which data transmission (retransmission) is carried out under the instruction of the user, as well as with the present transmission device. Thus, the present reception device can be seen as a data reception device which receives transmission data and returns a reception result notification corresponding to a reception result, and is characterized by comprising: a storing section which stores information of transmission data having already been received; and a reception control section which determines whether newly-received transmission data is retransmission data of the transmission data having already been received or initial transmission data being different from the retransmission data, on ground of the information stored in the storing section.

A data reception method (present reception method) of the present invention, by which transmission data is received and a reception result notification corresponding to a reception result is returned, is characterized by comprising the steps of:

(a) storing information of transmission data having already been received; and (b) determining whether newly-received transmission data is retransmission data of the transmission data having already been received or initial transmission data being different from the retransmission data, on ground of the information being stored.

The present reception method is a data reception method adopted in the present reception device. Thus, the present reception method makes it possible to systematically manage the related sets of transmission data.

A data reception program of the present invention is characterized by causing a computer of an information communication device to function as the reception control section of the present reception device.

It is possible to see that the data reception program of the present invention is a data reception program for causing a computer of an information communication device to execute the steps (a) and (b) of the present reception method.

By causing the computer of the information communication device to read these programs, the process of the present reception device (present reception method) can be implemented using the computer.

Recording these programs in a computer-readable recording medium makes it possible to distribute and store the programs with ease. Furthermore, by reading out the programs from the recording medium, the information communication device including the computer can carry out data transmission in accordance with the present reception device (present reception method).

One can see that the present invention relates to a network communication device which transmits data such as image information via a network, and more specifically, the present invention relates to a network communication device which transmits data in accordance with predetermined transmission settings, and requires a receiving end to return a response and confirms whether or not the response is returned.

Conventional network facsimile machines may be arranged such that, when an e-mail message is received and image information attached thereto is printed out as a received document, the e-mail message received by a mail server device is deleted in order not to unnecessarily carry out the transmission again.

Further, one can argue that, there has been the following problem: Being different from the case of transmitting information using a typical facsimile machine, when information is transmitted via e-mail using a network facsimile, it is impossible in the transmitting end to determine whether or not the receiving end correctly carried out the reception, and whether or not the receiving end properly carried out the processing. This is because, being different from a typical facsimile machine carrying out real time communication via PSTN, in a network facsimile machine, a receiving-end terminal is not always connected to a mail server device.

Even if the receiving-end terminal cannot carry out the reception, the transmission from the transmitting-end machine to the mail server device can be done anyway. Thus, at the moment of transmission, it is not possible in the transmitting end to recognize whether correct reception and proper processing are carried out or not, as described above. Therefore, conventionally, when there is a need to confirm safe delivery of the information transmitted from the network facsimile machine, the operator must inconveniently confirm by a telephone call. It is also a problem that e-mail communication loses one of its advantages over telephone communication that the parties involved do not need to talk in real time.

Accordingly, a conventional method technique addressing these shortcomings is defined by the MDN method in RFC 2298 which provides a means of confirming safe delivery of an e-mail message whereby upon reception of an e-mail message, the receiving-end terminal sends a delivery confirmation (reception result confirmation) back to the transmitting-end terminal. According to this method, confirmation is obtained in such a manner that a reception result/progress in the receiving end of the outgoing mail is notified to the transmitting end by sending a delivery confirmation mail (reception result mail) in a predetermined format.

When the MDN is adopted, if the transmitting-end terminal and receiving-end terminal support the MDN, the confirmation of the communication (reception result) is carried out using an MDN field. More specifically, in the transmitting end, an address to which a delivery confirmation mail (reception confirmation mail) is wished to be sent is specified in the MDN field, and in the receiving end, the delivery confirmation mail is returned to the address specified in the MDN field.

Meanwhile, conventional Internet facsimile machines do not carry out retransmission in order to prevent repeated transmission errors on the occasion of the retransmission, and this hinders the improvement of data transmission efficiency. That is to say, in a conventional arrangement, although an unreceived report indicating the occurrence of a transmission error is displayed, retransmission is not carried out in order not to cause a transmission error. On this account, if a transmission error occurs in data for any reason, retransmission of the data is not carried out so that the transmission cannot be completed, and hence the data transmission efficiency decreases. Thus, one can see that the objective of the present invention is to provide a network communication device which properly carries out retransmission when a transmission error occurs, and thus can improve the data transmission efficiency.

One can argue that a network communication device of the present invention carries out data transmission via a network, under predetermined transmission settings, and has a response confirmation function which is to require a receiving end to return a response and confirm whether or not the response is returned.

It is possible to see that the transmission function of the digital multifunction device 11 is such a function that, when image data of a scanned document is transmitted to an external device, an e-mail message is generated by adding an e-mail address of the external device to the image data, and this e-mail message is transmitted to the external device via the server 12 and the Internet 13.

The internet facsimile machine may be seen as below: this machine generates an e-mail message by adding facsimile document data to an e-mail address to which the data is transmitted. Then the machine is either connected to the Internet through the medium of a public switched telephone network, by being hosted by an internet service provider (corresponding to the mail server device 102 of the transmitting end in FIG. 38), or directly connected to the Internet, and consequently transfers the e-mail message to a mail server (corresponding to the mail server device 104 of the receiving end in FIG. 38) on the network. Then as both an Internet facsimile machine (corresponding to the Internet facsimile machine (transmitting-end terminal) 101 in FIG. 38) of the transmitting end and an Internet facsimile machine (corresponding to the Internet facsimile machine (transmitting-end terminal) 105 in FIG. 38) of the receiving end are connected to the Internet, the reception and transmission of the e-mail is actually carried out.

The e-mail message generating section 30 may perform the conversion to an e-mail format by adding a header to coded image data. The operation panel 32 may be used for receiving instructions such as the input of a receiving end, in addition to the document reading. Moreover, the digital line connection section 35 may connect the digital multifunction device 11 with a LAN (Local Area Network), for realizing e-mail transmission/reception and INF communication via the Internet.

The numeric keypad 43 of the input section 42 on the operation panel 32 may be used for inputting the number of images to be formed and the number of documents. The start key 45 may be used for starting the printing of images on sheets (recording media). Further, the clear key 44 may be used for clearing information inputted using the numeric keypad 43.

The digital multifunction device 11 may be provided with an MDN control section which carries out the request of delivery confirmation (delivery confirmation response) under the MDN function, the management of a received delivery confirmation response, and the control using the header information added by the e-mail message generating section 30. This MDN control section corresponds to the detecting means for detecting a transmission error concerning data transmission and the retransmitting means for retransmitting data when the transmission error is detected. Note that, the transmission error indicates that the transmission is turned out not to be properly completed, according to the delivery confirmation. In combination with the operation panel 32, the MDN control section may function as setting change means for changing predetermined transmission settings and confirming means for confirming the change of the transmission settings.

The digital multifunction device 11 may be arranged in such a manner that, when, as an internet facsimile machine, transmitting facsimile document data (image data), the e-mail message generating section 30 adds header information to the facsimile document data which has been encoded in the encoding/decoding section 27, so as to cause the data to have an e-mail format.

The header of the outgoing mail shown in FIG. 5 can be seen as an area for displaying information concerning transmission/reception of e-mail messages and the delivery via the Internet. Each line (field) of the header indicates each particular set of information used in the transmission/reception.

The MDN function can be seen as a function to notify the processing state by a message, after the success of delivery. Further, one can see that the MDN function is a function that realizes delivery confirmation by causing the Internet facsimile machine of the receiving end to return a delivery confirmation response to the Internet facsimile machine of the transmitting end, when an e-mail message is received. Note that, the Disposition field of a reception result mail may indicate whether or not the processing of an e-mail message corresponding to a Message-Id is succeeded.

One can argue that, in the digital multifunction device 11, the main control section 21 determines whether or not a reception error occurs, the main control section 21 and operation panel 32 change the transmission settings, and the main control section 21 carries out retransmission, and hence a reading error in the transmitting-end machine is prevented so that the possibility of the occurrence of another reception error decreases.

In the digital multifunction device 11, after determining whether or not the notification of capability is transmitted from the receiving end, if the notification has been done, the settings are changed in accordance with the notified capability and retransmission is carried out. Thus, the transmission efficiency is improved compared to an arrangement in which the change to basic settings is carried out irrespective of the notification of capability.

If the notification of capability is not carried out, the format of the image data is changed to basic one and the image data is retransmitted. Thus, even if the notification is not carried out, it is possible to reduce the number of unnecessary retransmissions, by transmitting data in a format which is surely supported in the receiving end.

A typical INF communication has a standard encoding scheme so that it is possible to assume that a receiving end has MH-coding (decoding) capability. On the contrary, in the above-mentioned arrangement concerning the present invention, the encoding scheme is not fixed to the MH so that an encoding scheme which realizes a higher compression ratio as a whole device can be selected. Moreover, since the transmission is carried out in accordance with an encoding scheme specified by the user, retransmission is carried out further efficiently.

Figure 38:
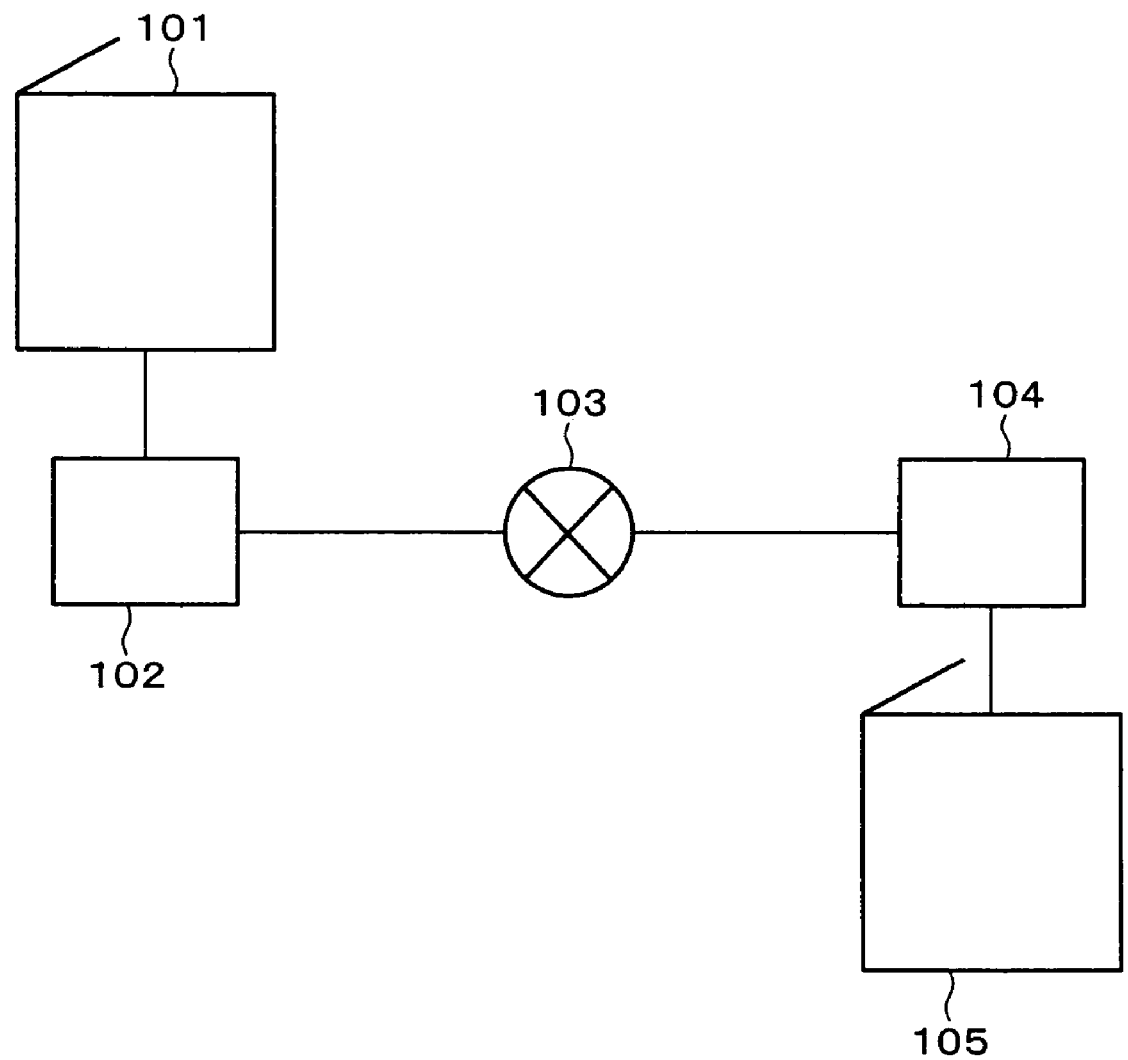
FIG. 38 is a schematic view, illustrating an arrangement of a conventional communication system.

According to the process shown in FIG. 38, one can see that, when the notification of capability is not transmitted from the receiving end, retransmission is carried out in original settings until the secondarily set number of times to be retransmitted, rather than immediately changing the settings to original ones. It can be said that, when the transmission is completed as the retransmission is carried out, this arrangement makes it possible to improve the transmission efficiency, compared to the arrangement that the settings are immediately changed to the original ones.

One can see that the present invention relates to the following first to sixth communication devices (network communication devices) and a first e-mail message transmitting device.

That is to say, the first communication device is a communication device which has a response confirmation function by which, when data is transmitted in accordance with predetermined transmission settings, the communication device requires a receiving end to respond and confirms whether or not the response is returned, the communication device comprising detecting means for detecting a transmission error concerning the data transmission, setting change means for changing the transmission settings to the changed settings, and retransmitting means for retransmitting data in accordance with the changed settings, when the detecting means detects the transmission error.

The first communication device transmits an arbitrary set of data in accordance with predetermined transmission settings. When the detecting means detects a transmission error, the setting change means changes the transmission settings to changed settings which are proper settings and different from the transmission settings, and then the retransmitting means carries out retransmission. The transmission error is, for instance, caused by a reading (reception) error in the receiving end. In this case, the transmission error is included in the response from the receiving end. Further, the transmission error may occur due to a connection error which causes the connection to the receiving end on the network to be impossible, such as a network trouble. In this case, the transmission error is notified from a mail server of the first communication device, which is connected to the main body of the first communication device.

The transmission settings and changed settings are settings for transmitting data, and equivalent to, for instance, a resolution of image data being transmitted, encoding scheme, and file format. If the transmission under predetermined transmission settings cause a transmission error, the first communication device changes the transmission settings to changed settings. The changed settings are standard settings, compared to the transmission settings. That is to say, for instance, retransmission is carried out in accordance with settings in which the resolution of image data being transmitted is lowered, a standard encoding scheme which is low-compression ratio and supported by any kinds of communication devices, or a standard file format which is supported by any kinds of communication devices. Thus, the reading error in the receiving end can be prevented, and hence the possibility of the occurrence of another transmission error can be reduced. In other words, it is possible to prevent the occurrence of such a problem that the transmitted data cannot be decoded in the receiving end due to the lack of capability of the device in the receiving end, and hence a transmission error is caused. Note that, the changed settings may include a setting which indicates that retransmission is not carried out, and if this setting is included, the retransmitting means does not carry out retransmission. With this arrangement, it is possible to provided such a communication device by which, even if a transmission error occurs, retransmission is properly carried out so that the efficiency of data transmission can be improved.

The second communication device is basically identical with the first communication device, except the following point: The transmission settings are changed to a standard encoding scheme as changed settings. This standard encoding scheme is used as a standard for transmission/reception of image data via a network, and it has been stipulated that every communication device must have this standard encoding scheme. Since the second communication device changes the transmission settings to the standard encoding scheme that every communication device has, a reading (reception) error in the receiving end is certainly prevented so that the possibility of the occurrence of a transmission error on the occasion of retransmission decreases.

The third communication device is basically identical with the first communication device, except the following point: When the reception capability of the receiving end is notified by the response from the receiving end, the setting change means changes the transmission settings to changed settings corresponding to the notified reception capability. With this arrangement, the transmission settings are changed to changed settings corresponding to the reception capability of the receiving end, so that the reading error in the receiving end is certainly prevented and the possibility of the occurrence of the transmission error on the occasion of retransmission is further decreased.

The fourth communication device is basically identical with any one of the first through third communication device, except the following point: When the detecting means detects a transmission error as an error of connection to the receiving end, the setting change means changes the settings to be the above-mentioned settings prohibiting retransmission, so that the retransmitting means does not retransmit the data. With this arrangement, since the retransmission is not carried out on the occasion of the connection error such as a network trouble, unnecessary retransmission is not carried out and a further transmission error does not occur.

The fifth communication device is basically identical with any one of the first through third communication devices, except the following point: When the detecting means detects a transmission error which is an error of connection to the receiving end and notified from the above-mentioned mail server connected to the main body of the communication device, the setting change means changes the settings to be the above-mentioned settings prohibiting retransmission, so that the retransmitting means does not retransmit the data. With this arrangement, since the retransmission is not carried out on the occasion of the connection error such as a network trouble, unnecessary retransmission is not carried out and a further transmission error does not occur.

The sixth communication device is basically identical with any one of the first through fifth communication device, except the following point: Confirming means for confirming the contents of the changed settings is provided, and after the confirmation by the confirming means, the retransmitting means carries out the retransmission. In the sixth communication device, the retransmission is carried out after the confirming means confirms the contents of the changed settings. Thus, it is possible to prevent retransmission by mistake, when the contents of the changed settings are not appropriate. The sixth communication device may be arranged in such a manner that, when the contents of the changed settings are not appropriate, the retransmission is carried out after the setting change means further changes the settings.

The first e-mail message transmitting device is an e-mail message transmitting device which has a response confirmation function by which, when data is transmitted in accordance with predetermined transmission settings, the e-mail message transmitting device requires a receiving end to respond and confirms whether or not the response is returned, the e-mail message transmitting device comprising detecting means for detecting a transmission error concerning the data transmission, and retransmitting means for retransmitting data when the detecting means detects the transmission error. With this arrangement, it is possible to provide such a communication device that, even if the transmission error is detected, retransmission is properly carried out and hence the data transmission efficiency is improved.

As an example of the arrangement using the MDN, the document 3, "Japanese Laid-Open Patent Application No. 2001-265675 (Tokukai 2001-265675; published on Sep. 28, 2001), discloses a communication terminal device which, when a reception result mail is detected, registers information indicating that communication has succeeded, as an item of a communication result of a communication management information registered in a communication management table regarding a transmitted e-mail message. That is, according to this device, a reception result mail and an error notification regarding the transmitted e-mail message which are returned with an e-mail message from an e-mail system on the network, can be collectively managed as communication management information. However, in the arrangement of the above document, since communication management is not carried out sufficiently in a receiving-end communication device, there is a problem that the receiving-end machine cannot perform the communication management in a systematic manner.

That is, it can be said that this arrangement can determine whether the communication for a previously transmitted e-mail message has succeeded, and whether the communication for a retransmitted e-mail message, if any, has succeeded. However, in the arrangement of the above document, the receiving-end communication device is not considered. Therefore, in the communication management of the receiving-end machine, the previously transmitted e-mail message and the retransmitted e-mail message cannot be recognized whether or not they are transmitted with substantially the same content. Consequently, according to this arrangement, if an e-mail with substantially the same content as the previously transmitted e-mail is retransmitted to the receiving-end machine, the receiving-end machine performs communication management for the e-mail messages as different results. There is the possibility that the receiving-end machine could not perform the communication management in a systematic manner, resulting in inconvenience and confusion to the user.

Further, an object of the present invention, in the receiving-end communication device, can be also said to provide a communication device which can perform the communication management in a systematic manner.

Further, it can be also said that the present invention relates to a communication device which can distribute information through an e-mail message via the network, and more specifically, relates to a communication device which can perform a delivery confirmation of an e-mail message using a function of delivery confirmation (verification of reception result) such as MDN.

It can be also said that the "Final-Recipient" field of the reception result mail indicates a reception address to which the MDN is returned. Further, it can be also said the "Disposition-Notification-Options" field is a field to designate a MDN replying condition. That is, depending on this, "content-X-From-Request" field is designated in the reception result mail in FIG. 26(c). Further, depending on this, Message-Id of the initially transmitted image mail can be designated in the "Disposition-Notification-Options" field of the retransmitted mail shown in FIG. 27. In case of a reception failure, it can be said that a reception result mail with "Subject" field of FIG. 26(a) indicating the reception failure is transmitted.

It can be also said that the mail having a Ref No. "005" shown in FIG. 29(b) corresponds to a mail received in step S83, and the mail having a Ref No. "006" corresponds to a mail received in step S87. It can be also said that the arrangement shown in FIGS. 36 and 37 is a combination of the arrangement using mails in FIGS. 25 through 32 and the arrangement only using Message-Id as group identification ID. Further, an item of "communication mode" in the communication management table is an item which is required when the digital multifunction device 11 has the following two communication modes: the ordinary facsimile mode and the INF communication mode.

Further, the present invention can be expressed as the following seventh through fifteenth communication devices and a first network communication device. That is, the seventh communication device is a communication device which is provided with receiving means for receiving an e-mail message, and responding means for making a response in accordance with a request for delivery confirmation of the e-mail message received by the receiving means, the communication device including comparing means for comparing in a predetermined scheme a first e-mail received by the receiving means that has made a response through the responding means to a second e-mail received by the receiving means, and determining means for determining whether the second e-mail is a retransmission mail that the first e-mail is retransmitted in accordance with a comparison result of the comparing means.

The seventh communication device makes a response of a delivery confirmation of a received e-mail message in accordance with a delivery confirmation request by the MDN. Meanwhile, a transmitting-end communication device which has transmitted the e-mail message to the seventh communication device, for example, upon receipt of a delivery confirmation response, retransmits the e-mail if necessary in accordance with the content of the received response. Upon receipt of an e-mail, the seventh communication device compares in a predetermined scheme the received e-mail to the e-mail which has been received previously and to which a response of delivery confirmation has been made. Then, the seventh communication device determines whether or not the received e-mail is the e-mail which has been received previously and to which a response of delivery confirmation has been made.

Therefore, for example, a received e-mail message can be appropriately managed, depending on whether or not the e-mail is a retransmission mail with the same content as the previously received e-mail. Note that, the predetermined scheme of comparison includes comparison between message IDs of the e-mails, for example.

Further, the eighth communication device includes recording and managing means for recording and managing, as communication management information, information on received and transmitted e-mails in the seventh communication device, the recording and managing means, when the determining means determine that the received second e-mail is a retransmission mail of the first e-mail, recording information that the second e-mail is a retransmission mail of the first e-mail, with added to the communication management information.

The eighth communication device, when it is determined that a newly-received e-mail, for example, is a retransmission mail of the e-mail which has been received previously and to which a response of delivery confirmation has been made, records and manages information that the newly-received e-mail is a retransmission mail with added to the communication management information. This facilitates the management of e-mails.

The ninth communication device includes recording and managing means for recording and managing, as communication management information, information on a received and transmitted e-mails in the seventh communication device, the recording and managing means, when the determining means determine that the received second e-mail is a retransmission mail of the first e-mail, updating the communication management information of the first e-mail regarding the second e-mail. The third communication device, when the newly-received e-mail, for example, is a retransmission mail of the e-mail having been received previously and to which a response of delivery confirmation has been made, updates information of the e-mail having been received previously and to which a response of delivery confirmation has been made. This facilitates the management of e-mails.

The tenth communication device has an arrangement in which the comparing means compares the message ID of the first e-mail to the message ID of the second e-mail in the seventh and eighth communication devices. Comparing two e-mails in their message IDs enables easy comparison of the two e-mails.

The eleventh communication device has an arrangement in which the responding means add the message ID of the e-mail that the receiving means has received to a response in accordance with a delivery confirmation request in the tenth communication device. The eleventh communication device adds the message ID of the received e-mail to a response. Meanwhile, a transmitting-end communication device that has transmitted the e-mail to the eleventh communication device retransmits an e-mail including the message ID, which is included in the received delivery confirmation, for example, and is the same as that included in the previously transmitted e-mail. The eleventh communication device, when receiving an e-mail, compares the message ID of the received e-mail to the message ID of the e-mail having been received previously and to which a response of delivery confirmation has been made. This can readily realize the aforementioned tenth communication device.

The twelfth communication device is a communication device which is provided with transmitting means for transmitting an e-mail to the tenth communication device, the transmitting means, when receiving a delivery confirmation mail indicating that the communication has been failed in response to an e-mail transmitted with a delivery confirmation request added, retransmitting the transmitted e-mail including the same message ID as that included in the transmitted e-mail. The twelfth communication device can readily realize the tenth communication device by making a set with the tenth communication device.

The thirteenth communication device has an arrangement in which the comparing means compare the message ID of the e-mail returned in response to the delivery confirmation request to the message ID of the second e-mail in any one of the seventh through ninth communication devices. Comparing two e-mails in their message IDs enables easy comparison of the two emails. This can readily realize the seventh through ninth communication devices.

The fourteenth communication device is a communication device which is provided with transmitting means for transmitting an e-mail to the thirteenth communication device, the transmitting means, when receiving a delivery confirmation mail indicating that the communication has been failed in response to an e-mail transmitted with a delivery confirmation request added, retransmitting the transmitted e-mail including the message ID which has been added to the delivery confirmation mail. The fourteenth communication device can readily realize the thirteenth communication device by making a set with the thirteenth communication device.

The fifteenth communication device is a communication device which is provided with transmitting means for transmitting an e-mail to the tenth or the thirteenth communication device, the transmitting means, when receiving a delivery confirmation mail indicating that the communication has been failed in response to an e-mail transmitted with a delivery confirmation request added, retransmitting the transmitted e-mail including the same message ID as that included in the transmitted e-mail and the message ID which has been added to the delivery confirmation mail. This arrangement can also realize the tenth or thirteenth communication device readily by making a set with the tenth or the thirteenth communication device.

The first network communication device is a communication device which is provided with receiving means for receiving image data and responding means for making a response in accordance with a delivery confirmation request of the image data received by the receiving means, the communication device including comparing means for comparing in a predetermined scheme reception information of first image data received by the receiving means that has made a response through the responding means to reception information of second image data received by the receiving means, and determining means for determining whether the second image data is a retransmitted data of the first image data in accordance with a comparison result of the comparing means.

The first network communication device makes a response of a delivery confirmation of a received e-mail message in accordance with a delivery confirmation request by the MDN (Message Disposition Notification), for example. Meanwhile, a transmitting-end communication device which has transmitted the e-mail message to the first network communication device, upon receipt of a response of delivery confirmation, for example, retransmits the e-mail if necessary in accordance with the content of the received response. Upon receipt of an e-mail, the first network communication device compares in a predetermined scheme the received e-mail to the e-mail having been received previously and to which a response of delivery confirmation has been made. Then, the first network communication device determines whether or not the received e-mail is the e-mail having been received previously and to which a response of delivery confirmation has been made. Therefore, for example, a received e-mail message can be appropriately managed, depending on whether or not the e-mail is a retransmission mail with the same content as the previously received e-mail. Note that, the predetermined scheme of comparison includes comparison between message IDs of the e-mails, for example.

Further, the present invention is not limited to the foregoing embodiments, and variations of the present invention are possible within the scope of the claims. Therefore, other embodiments obtained by properly combining the members in the embodiments are included in the technical range of the present invention.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A data transmission device in which a reception result of transmission data is confirmed on ground of a reception result notification transmitted from a receiving-end machine, comprising:

a transmission data generation section which generates the transmission data and a reception result request to be transmitted to the receiving-end machine;

a transmission control section which controls and causes the transmission data generation section to generate the transmission data and transmits the generated transmission data and the reception result request simultaneously to the receiving-end machine; and a transmitting-end storing section which stores lists indicative of whether or not a format of the transmission data is to be altered when the transmission data is retransmitted, the lists being set with respect to the receiving-end machine, the transmission control section stopping generating retransmission data and canceling the transmission when a communication error has nothing to do with a receiving capability of the receiving-end machine, when retransmitting the transmission data, the transmission control section determining whether or not the format of the transmission data is to be altered based on the lists, causing the transmission data generation section to generate the retransmission data with a format altered from the format of the transmission data if the transmission control section determines alteration of the format is needed, and causing the transmission data generation section not to alter the format of the transmission data if the transmission control section determines the alteration of the format is not needed, when the transmission control section determines the alteration of the format is needed and when the reception result notification includes receiving capability information, the transmission control section retransmitting the retransmission data with the format altered from the format of the transmission data in accordance with the receiving capability information, the receiving capability information including (i) whether the receiving-end machine is capable of only monochrome printing or capable of both monochrome printing and color printing, (ii) a format of image data processable in the receiving-end machine, (iii) resolution of printing in the receiving-end machine, (iv) an aspect ratio of image data printable in the receiving-end machine, (v) an encoding scheme processable in the receiving-end machine, (vi) whether or not the receiving-end machine is capable of processing image data indicative of images with different encoding schemes and with different resolutions within one page, and (vii) a size of paper printable in the receiving-end machine, when the transmission control section determines the alteration of the format is needed and when the reception result notification does not include the receiving capability information, the transmission control section determining whether or not the number of times of actual retransmission of the transmission data is less than a predetermined set number of times, if the number of times of actual retransmission is less than the predetermined set number of times, the transmission control section retransmitting the transmission data without altering its format to the receiving-end machine, and if the number of times of actual retransmission is equal to or greater than the predetermined set number of times, the transmission control section retransmitting, to the receiving-end machine, the retransmission data obtained by altering at least one of an image format and a compression format of the transmission data to a predetermined basic format.

2. The data transmission device as defined in claim 1, wherein, when the retransmission data is generated, the transmission control section causes the retransmission data to have a most accepted format.

3. The data transmission device as defined in claim 1, wherein, when the retransmission data is generated, if a capability of the receiving-end machine is suggested in the reception result notification, the transmission control section causes the retransmission data to have a format corresponding to the capability.

4. The data transmission device as defined in claim 1, wherein, the transmission data includes image data, and the transmission control section alters a format of the image data of the transmission data, so as to cause the transmission data generation section to generate the retransmission data.

5. The data transmission device as defined in claim 1, wherein, when the communication error is a transmission error which is nothing to do with a capability of the receiving-end machine, the transmission control section calls off generation of the retransmission data.

6. The data transmission device as defined in claim 1, further comprising an operating section which displays information for a user and receives instructions from the user, wherein, the transmission control section controls and causes the operating section to display a format of the retransmission data for a user, and after receiving a retransmission instruction from the user, retransmits the retransmission data.

7. The data transmission device as defined in claim 1, wherein, the transmission control section controls and causes the transmission data generation section to generate transmission data made up of e-mail data.

8. A communication system, comprising the data transmission device defined in claim 1.

9. A non-transitory computer-readable medium encoded with computer executable instructions for executing a data transmission program, causing a computer of an information communication device to function as the transmission data generation section and transmission control section of the data transmission device defined in claim 1.

10. A non-transitory computer-readable medium encoded with computer executable instructions, recording the data transmission program defined in claim 9.

11. A data reception device, which receives the transmission data transmitted from the data transmission device defined in claim 1 and returns a reception result notification corresponding to the reception result, comprising:

a storing section which stores information of transmission data having already been received; and a reception control section which determines whether newly-received transmission data is retransmission data of the transmission data having already been received or initial transmission data being different from the retransmission data, on ground of the information stored in the storing section, wherein the data reception device returns the reception result notification to the data transmission device upon receipt of the transmission data, and the data transmission device generates the retransmission data based on the reception result.

12. The data reception device as defined in claim 11, wherein, the reception control section causes the storing section to store a communication management table which stores (i) an identifier of the transmission data having already been received and (ii) related information of the transmission data having already been received, in association with each other.

13. The data reception device as defined in claim 12, wherein, when the newly-received transmission data is determined as the retransmission data, the reception control section causes the communication management table to store an identifier of initial transmission data regarding the retransmission data, as related information of the retransmission data.

14. The data reception device as defined in claim 12, wherein, when the newly-received transmission data is determined as the retransmission data, the reception control section updates related information of initial transmission data regarding the retransmission data, in accordance with a reception result of the retransmission data.

15. The data reception device as defined in claim 11, wherein, a transmission control section of the data transmission device causes the initial transmission data and retransmission data regarding this initial transmission data to share a single first ID, and on ground of this first ID, the reception control section determines whether the newly-received transmission data is retransmission data or initial transmission data.

16. The data reception device as defined in claim 15, wherein, the reception control section causes the first ID attached to the transmission data to be included in the reception result notification.

17. The data reception device as defined in claim 11, wherein, a transmission control section of the data transmission device causes a second ID in transmitted reception result notification to be included in retransmission data regarding this transmitted reception result notification, and on ground of this second ID, the reception control section determines whether newly-received transmission data is retransmission data or initial transmission data.

18. The data reception device as defined in claim 15, wherein, in addition to the first ID, the transmission control section of the data transmission device causes a second ID in the transmitted reception result notification to be included in retransmission data regarding this transmitted reception result notification, and on ground of the first or second ID, the reception control section determines whether newly-received transmission data is retransmission data or initial transmission data.

19. A non-transitory computer-readable medium encoded with computer executable instructions for executing a data reception program, causing a computer of an information communication device to function as the reception control section of the data reception device defined in claim 11.

20. A non-transitory computer-readable medium encoded with computer executable instructions, storing the data reception program defined in claim 19.

21. The data transmission device as defined in claim 1, wherein the data transmission device has a MDN function, and the reception result request is derived from the MDN function.

22. A data transmission method in a transmitting-end machine, by which a reception result of transmission data is confirmed on ground of a reception result notification transmitted from a receiving-end machine, comprising the steps of:
  (a) a transmission data generation section included in the transmitting-end machine generating transmission data and a reception result request to be transmitted to the receiving-end machine; and
  (b) a transmission control section included in the transmitting-end machine transmitting the transmission data and the reception result request simultaneously to the receiving-end machine,
  the transmission control section stopping generating retransmission data and canceling the transmission when a communication error has nothing to do with a receiving capability of the receiving-end machine,
  when retransmitting the transmission data, the transmission control section determining whether or not a format of the transmission data is to be altered based on lists indicative of whether or not the format of the transmission data is to be altered when the transmission data is retransmitted, the lists being set with respect to the receiving-end machine, the transmission control section causing the transmission data generation section to generate the retransmission data with a format altered from the format of the transmission data if the transmission control section determines alteration of the format is needed, and causing the transmission data generation section not to alter the format of the transmission data if the transmission control section determines the alteration of the format is not needed,
  when the transmission control section determines the alteration of the format is needed and when the reception result notification includes receiving capability information, the transmission control section retransmitting the retransmission data with the format altered from the format of the transmission data in accordance with the receiving capability information,
  the receiving capability information including (i) whether the receiving-end machine is capable of only monochrome printing or capable of both monochrome printing and color printing, (ii) a format of image data processable in the receiving-end machine, (iii) resolution of printing in the receiving-end machine, (iv) an aspect ratio of image data printable in the receiving-end machine, (v) an encoding scheme processable in the receiving-end machine, (vi) whether or not the receiving-end machine is capable of processing image data indicative of images with different encoding schemes and with different resolutions within one page, and (vii) a size of paper printable in the receiving-end machine,
  when the transmission control section determines the alteration of the format is needed and when the reception result notification does not include the receiving capability information, the transmission control section determining whether or not the number of times of actual retransmission of the transmission data is less than a predetermined set number of times,
    if the number of times of actual retransmission is less than the predetermined set number of times, the transmission control section retransmitting the transmission data without altering its format to the receiving-end machine, and
    if the number of times of actual retransmission is equal to or greater than the predetermined set number of times, the transmission control section retransmitting, to the receiving-end machine, the retransmission data obtained by altering at least one of an image format and a compression format of the transmission data to a predetermined basic format.

23. A non-transitory computer-readable medium encoded with computer executable instructions for executing a data transmission program, causing a computer of an information communication device to execute the steps (a), (b), and (c) of the data transmission method defined in claim 22.

24. A non-transitory computer-readable medium encoded with computer executable instructions, recording the data transmission program defined in claim 23.

25. The data transmission method as defined in claim 22, wherein the transmitting-end machine has a MDN function, and the reception result request is derived from the MDN function.

26. A communication system, comprising:
  a data transmission device in which a reception result of transmission data is confirmed on ground of a reception result notification transmitted from a receiving-end machine; and
  a data reception device which receives the transmission data transmitted from the data transmission device and returns a reception result notification corresponding to the reception result, the data transmission device comprising:
  a transmission data generation section which generates the transmission data and a reception result request to be transmitted to the receiving-end machine;
  a transmission control section which controls and causes the transmission data generation section to generate the transmission data, and transmits the generated transmission data and the reception result request simultaneously to the receiving-end machine; and
  a transmitting-end storing section which stores lists indicative of whether or not a format of the transmission data is to be altered when the transmission data is retransmitted, the lists being set with respect to the receiving-end machine,
  the transmission control section stopping generating retransmission data and canceling the transmission when a communication error has nothing to do with a receiving capability of the receiving-end machine,
  when retransmitting the transmission data, the transmission control section determining whether or not the format of the transmission data is to be altered based on the lists, causing the transmission data generation section to generate the retransmission data with a format altered from the format of the transmission data if the transmission control section determines alteration of the format is needed, and causing the transmission data generation section not to alter the format of the transmission data if the transmission control section determines the alteration of the format is not needed, when the transmission control section determines the alteration of the format is needed and when the reception result notification includes receiving capability information, the transmission control section retransmitting the retransmission data with the format altered from the format of the transmission data in accordance with the receiving capability information, the receiving capability information including (i) whether the receiving-end machine is capable of only monochrome printing or capable of both monochrome printing and color printing, (ii) a format of image data processable in the receiving-end machine, (iii) resolution of printing in the receiving-end machine, (iv) an aspect ratio of image data printable in the receiving-end machine, (v) an encoding scheme processable in the receiving-end machine, (vi) whether or not the receiving-end machine is capable of processing image data indicative of images with different encoding schemes and with different resolutions within one page, and (vii) a size of paper printable in the receiving-end machine, when the transmission control section determines the alteration of the format is needed and when the reception result notification does not include the receiving capability information, the transmission control section determining whether or not the number of times of actual retransmission of the transmission data is less than a predetermined set number of times, if the number of times of actual retransmission is less than the predetermined set number of times, the transmission control section retransmitting the transmission data without altering its format to the receiving-end machine, and if the number of times of actual retransmission is equal to or greater than the predetermined set number of times, the transmission control section retransmitting the retransmission data obtained by altering at least one of an image format and a compression format of the transmission data to a predetermined basic format, the data reception device comprising:

a storing section which stores information of transmission data having already been received; and a reception control section which determines whether newly-received transmission data is retransmission data of the transmission data having already been received or initial transmission data being different from the retransmission data, on ground of the information stored in the storing section.

* * * * *